(12) United States Patent
Zhang

(10) Patent No.: US 10,834,879 B2
(45) Date of Patent: Nov. 17, 2020

(54) METHODS AND APPARATUSES FOR PLANT AERATION

(71) Applicant: Texas Ecological Technology LLC, Austin, TX (US)

(72) Inventor: Qian Zhang, Austin, TX (US)

(73) Assignee: Texas Ecological Technology LLC, Austin, TX (US)

( * ) Notice: Subject to any disclaimer, the term of this patent is extended or adjusted under 35 U.S.C. 154(b) by 783 days.

(21) Appl. No.: 15/144,758

(22) Filed: May 2, 2016

(65) Prior Publication Data

US 2017/0238485 A1 Aug. 24, 2017

Related U.S. Application Data

(63) Continuation of application No. 13/061,448, filed as application No. PCT/US2009/055422 on Aug. 28, 2009, now abandoned.

(60) Provisional application No. 61/219,704, filed on Jun. 23, 2009, provisional application No. 61/190,550, filed on Aug. 30, 2008.

(51) Int. Cl.
| | | |
|---|---|---|
| *A01G 31/00* | (2018.01) | |
| *A01G 31/02* | (2006.01) | |
| *A01G 7/00* | (2006.01) | |
| *A01G 33/00* | (2006.01) | |

(52) U.S. Cl.
CPC ............. *A01G 31/02* (2013.01); *A01G 7/00* (2013.01); *A01G 33/00* (2013.01); *Y02P 60/216* (2015.11)

(58) Field of Classification Search
CPC .................................. A01G 9/02; A01G 31/02

USPC ............... 47/37.7, 37.8, 59 R, 60, 64, 79–81
See application file for complete search history.

(56) References Cited

U.S. PATENT DOCUMENTS

| | | | | |
|---|---|---|---|---|
| 1,383,368 A | * | 7/1921 | Ambrose | A01G 27/02 47/79 |
| 2,814,911 A | * | 12/1957 | Shep | A01G 27/00 47/80 |
| 3,823,508 A | * | 7/1974 | Takehara | A01G 31/02 47/63 |
| 4,133,141 A | * | 1/1979 | Lee | A01G 9/02 47/59 R |
| 4,355,484 A | * | 10/1982 | Mandish | A01G 31/02 47/63 |
| 4,392,327 A | * | 7/1983 | Sanders | A01G 31/02 47/59 R |
| 4,397,114 A | * | 8/1983 | Skaife | A01G 9/02 47/62 C |
| 4,557,070 A | * | 12/1985 | Oyama | A01G 27/04 47/80 |
| 4,745,707 A | * | 5/1988 | Newby | A01G 27/00 47/32.7 |
| 5,225,342 A | * | 7/1993 | Farrell | A01G 5/06 435/430 |
| 5,261,185 A | * | 11/1993 | Koide | A01G 31/02 47/63 |

(Continued)

FOREIGN PATENT DOCUMENTS

WO     WO-2005115129 A2 * 12/2005 ............. A01G 31/00

*Primary Examiner* — Magdalena Topolski
*Assistant Examiner* — Danielle A Clerkley
(74) *Attorney, Agent, or Firm* — Norton Rose Fulbright US LLP

(57) ABSTRACT

Plant-aeration systems, methods for plant aeration, plant-aeration cells, methods of environmental remediation, systems for algae cultivation, and apparatuses for algae aeration.

18 Claims, 19 Drawing Sheets

(56) References Cited

U.S. PATENT DOCUMENTS

| | | | | |
|---|---|---|---|---|
| 5,269,094 A * | 12/1993 | Wolverton | ............. | A01G 31/02 |
| | | | | 210/602 |
| 5,461,825 A * | 10/1995 | Daimon | .................. | A01G 9/02 |
| | | | | 47/71 |
| 5,806,242 A * | 9/1998 | Park | ........................ | A01G 9/16 |
| | | | | 47/81 |
| 5,852,896 A * | 12/1998 | Flasch, Jr. | .............. | A01G 27/02 |
| | | | | 47/79 |
| 7,080,480 B2 * | 7/2006 | Urban | ................ | A01G 13/0237 |
| | | | | 210/170.03 |
| 7,392,616 B1 * | 7/2008 | Bagby | .................. | A01G 9/027 |
| | | | | 47/65.9 |
| 2006/0201063 A1 * | 9/2006 | Huon | .................. | A01G 7/06 |
| | | | | 47/81 |
| 2007/0266630 A1 * | 11/2007 | Bradley | .................. | A01G 9/02 |
| | | | | 47/81 |
| 2009/0107043 A1 * | 4/2009 | Carney | ................. | A01G 31/02 |
| | | | | 47/62 R |

\* cited by examiner

METHODS AND APPARATUSES FOR PLANT AERATION

CROSS REFERENCES TO RELATED APPLICATIONS

This application is a continuation of U.S. patent application Ser. No. 13/061,448, filed May 23, 2011, which claims priority to a national phase application under 35 U.S.C. § 371 of International Application No. PCT/US2009/055422, filed Aug. 28, 2009, which claims priority to U.S. Application Ser. No. 61/219,704, filed Jun. 23, 2009, and U.S. Application Ser. No. 61/190,550, filed Aug. 30, 2008, all of which are incorporated by reference without disclaimer.

BACKGROUND OF THE INVENTION

1. Field of the Invention

The present invention relates generally to plant growth and aeration and, more particularly, but not by way of limitation, to methods and apparatuses for promoting plant growth in an environment having both liquid and air (and/or other gases), such as, for example, in hydroponics systems, wetland construction or reconstruction, wastewater treatment systems, water-based agriculture systems, and/or algae cultivation systems.

2. Description of Related Art

A number of plant growth and aeration systems have been developed and/or are in use in the art. Some conventional plant-root aeration methods involve dispensing air into liquid, or dispensing liquid and air flows into liquid. In one example, water containing algae is disposed in hanging transparent bags and exposed to light. Some aeration methods involve taking advantage of tidal flow to periodically expose generally submerged plant roots to air.

SUMMARY OF THE INVENTION

The present disclosure includes various embodiments of plant-aeration systems, methods for plant aeration, plant-aeration cells, methods of environmental remediation, systems for algae cultivation, and apparatuses for algae aeration.

Some embodiments of the present plant-aeration systems for aeration of one or more plants, comprise: a plant-aeration cell that comprises: an air reservoir unit comprising material that is gas-impermeable; and a root holder unit connectable to the air reservoir unit, the root holder unit comprising a first set of one or more openings and a second set of one or more openings; the air reservoir unit and the root holder unit forming, when connected to each other, a reservoir from which gas cannot escape when the reservoir is occupied by liquid having a level that is above the openings in the first and second sets of openings.

In some embodiments, the system further comprises: a plant-growing cell configured to be disposed in operative relation with the plant-aeration cell, the plant-growing cell defining an open area in which one or more plants can grow, the plant-growing cell comprising mesh material. In some embodiments, the system further comprises: one or more additional plant-aeration cells, that each comprise: an air reservoir unit comprising material that is gas-impermeable; and a root holder unit connectable to the air reservoir unit, the root holder unit comprising a first set of one or more openings and a second set of one or more openings; the air reservoir unit and the root holder unit forming, when connected to each other, a reservoir from which gas cannot escape when the reservoir is occupied by liquid having a level that is above the openings in the first and second sets of openings. In some embodiments, the system further comprises: one or more additional plant-growing cells, each configured to be disposed in operative relation with one or more of the plant-aeration cells, each defining an open area in which one or more plants can grow, and each comprising mesh material.

In some embodiments, the air reservoir and root holder units of each plant-aeration cell are integrally connected to each other. In some embodiments, the first set of openings comprises one opening. In some embodiments, the second set of openings comprises one opening. In some embodiments, the first set of openings comprises multiple openings. In some embodiments, the second set of openings comprises multiple openings.

In some embodiments, each plant-aeration cell possesses a generally rectangular shape when viewed from above. In some embodiments, the root holder unit of each plant-aeration cell includes a first side in which the one or more openings in the first set are disposed, and a second side in which the one or more openings in the second set are disposed, and the second side is oriented at a non-zero angle relative to the first side. In other embodiments, the first and second sides are parallel to each other.

In some embodiments, each plant-aeration cell possesses a generally hexagonal shape when viewed from above. In some embodiments, the root holder unit of each plant-aeration cell includes a first side in which the one or more openings in the first set are disposed, and a second side in which the one or more openings in the second set are disposed, and the second side is oriented at a non-zero angle relative to the first side. In some embodiments, the plant-aeration cell includes six sections connected to each other and defining a central open space bordered by the first set of one or more openings.

In some embodiments, the system further comprising an anti-mold agent disposed on at least a portion of an exterior surface of each plant-aeration cell. In some embodiments, the system further comprises an anti-mold agent disposed on at least a portion of an interior surface of each plant-aeration cell. In some embodiments, each plant-aeration cell includes an exterior surface having a white or off-white color. In some embodiments, each plant-aeration cell includes an interior surface having a black or dark color.

Some embodiments of the present methods for plant aeration comprise: providing a plant-aeration cell that comprises: an air reservoir unit comprising material that is gas-impermeable; and a root holder unit connected to the air reservoir unit, the root holder unit comprising a first set of one or more openings and a second set of one or more openings, the air reservoir unit and the root holder unit forming a reservoir from which gas cannot escape when the reservoir is occupied by liquid having a level that is above the openings in the first and second sets of openings. Some embodiments further comprise: disposing the cell in an environment that is exposed to liquid continuously or at least intermittently, such that: a plant root extends through the one or more openings in the first set and into the reservoir; and liquid can flow into the reservoir to a level above the openings in the first and second sets such that gas is trapped in the reservoir above the level of the liquid.

Some embodiments of the present systems for aeration of one or more plants comprise: a root holder tray comprising a bottom layer and a top layer, the bottom layer and top layer cooperatively defining a plurality of root reservoirs, each root reservoir having a top and a bottom, the top layer of the root holder tray having a plurality of openings, each opening being in communication with a root reservoir and disposed a distance below the top of the root reservoir; an air reservoir tray defining an air reservoir having a closed top end and an open bottom end; and a tray rack configured to be coupled to one or more root holder trays and one or more air reservoir trays such that the one or more root holder trays and the one or more air reservoir trays are in a stacked, alternating orientation; where the system is configured such that if a root holder tray is disposed in the tray rack, an air reservoir tray is disposed in the tray rack above the root holder tray, and the tray rack is submersed in liquid, then at least a portion of each root reservoir of the root holder tray will fill with the liquid and the closed top end of the air reservoir tray will trap air. In some embodiments, the system further comprises a plurality of additional tray racks, root holder trays, and air reservoir trays; where the tray rack and the additional tray racks are coupled to one another. In some embodiments, the tray rack and the additional tray racks are coupled to one another to define a ring configuration with an open space in the middle of the ring configuration.

Some embodiments of the present plant-aeration cells comprise: a body having a top side, a bottom side, an outer sidewall, and an inner sidewall, the outer sidewall having a height and at least partially defining an outer perimeter of the plant-aeration cell, the inner sidewall having a height and defining an inner passage extending through the plant-aeration cell from the top side to the bottom side, the outer and inner sidewalls cooperatively defining an air reservoir between the outer perimeter and the inner passage, the inner sidewall having one or more root openings extending through the inner sidewall between the air reservoir and the inner passage, and the body having one or more connectors configured to couple the plant-aeration cell to an adjacent plant-aeration cell; where the plant-aeration cell is configured such that if the plant-aeration cell is positioned on a flat surface with the bottom side facing down and water is introduced onto the flat surface such that the water reaches a level above the root openings, gas will be trapped in the air reservoir.

Some embodiments of the present methods of environmental remediation comprise: disposing a plurality of plant-aeration cells along a coast between a high-tide point and a low-tide point, each plant-aeration cell comprising: an air reservoir unit comprising material that is gas-impermeable; and a root holder unit connectable to the air reservoir unit, the root holder unit comprising a first set of one or more openings and a second set of one or more openings; the air reservoir unit and the root holder unit forming, when connected to each other, a reservoir from which gas cannot escape when the reservoir is occupied by liquid having a level that is above the openings in the first and second sets of openings. In some embodiments, the method further comprises disposing a plurality of plants adjacent the plurality of plant-aeration cells such that at least one root from each plant extends through at least one opening in the first and second sets of openings of at least one plant-aeration cell.

Some embodiments of the present systems for algae cultivation comprise: a light-cycle container having an outer sidewall defining a cavity and having a plurality of air reservoirs, the light-cycle container configured such that: (a) if the light-cycle container is filled with liquid, at least a portion of the plurality of air reservoirs will trap gas; and (b) if light is incident on the light-cycle container, at least a portion of the incident light is permitted to enter the cavity through the sidewall; a dark-cycle container having an outer sidewall defining a cavity, the dark-cycle container having a plurality of air reservoirs within the cavity, the dark-cycle container configured such that: (a) if the dark-cycle container is filled with liquid, at least a portion of the plurality of air reservoirs will trap gas; and (b) if light is incident on the dark-cycle container, at least a portion of the incident light is not permitted to enter the cavity through the sidewall; and a control unit coupled to the light-cycle container and to the dark-cycle container, the control unit configured such that if liquid is present in one of the light-cycle container and the dark-cycle container, the control unit can pump the liquid to the other of the light-cycle container and the dark-cycle container.

In some embodiments, the light-cycle container comprises an inner sidewall dividing the cavity into an outer cavity and an inner cavity, and the plurality of air reservoirs are disposed in the inner cavity. In some embodiments, the outer sidewall of the light-cycle container is configured such that if light is incident on the light-cycle container, at least a portion of incident ultraviolet (UV) light is not permitted to enter the outer cavity through the outer sidewall and at least a portion of incident non-UV light is permitted to enter the outer cavity through the outer sidewall. In some embodiments, the light-cycle container is configured such that if light is incident on the light-cycle container, the outer cavity is filled with freshwater, and the inner cavity is filled with saltwater, then at least a portion of the incident light is internally reflected within the outer sidewall such that the internally-reflected portion of incident light is not permitted to exit the outer sidewall once it has passed through the outer sidewall. In some embodiments, the dark-cycle container comprises an inner sidewall dividing the cavity into an outer cavity and an inner cavity, and the plurality of air reservoirs are disposed in the inner cavity, and where the control unit is further configured such that: (a) if a first liquid is present in the inner cavity of one of the light-cycle container and the dark-cycle container, the control unit can pump the first liquid to the inner cavity of the other of the light-cycle container and the dark-cycle container; and (b) if a second liquid is present in the outer cavity of one of the light-cycle container and the dark-cycle container, the control unit can pump the second liquid to the outer cavity of the other of the light-cycle container and the dark-cycle container.

In some embodiments, the light-cycle container comprises a reflector adjacent the outer sidewall. In some embodiments, the control unit is further configured such that if a liquid is present in the cavity of one of the light-cycle container and the dark-cycle container such that gas is trapped in at least a portion of the respective air reservoirs, the control unit can: (a) pump the liquid out of the cavity of the one of the light-cycle container and the dark-cycle container; (b) pump the gas out of the cavity of the one of the light-cycle container and the dark-cycle container, and into the cavity of the other one of the light-cycle container and the dark-cycle container; and (c) pump the liquid into the cavity of the other one of the light-cycle container and the dark-cycle container. In some embodiments, the control unit is further configured such that if a liquid is present in the cavity of one of the light-cycle container and the dark-cycle container such that gas is trapped in at least a portion of the respective air reservoirs, and the liquid contains algae, the control unit can: (a) pump the liquid out of the cavity of the one of the light-cycle container and the dark-cycle container; (b) pump gas out of the cavity of the one of the light-cycle container and the dark-cycle container; (c) exchange a portion of the gas from the one of the light-cycle container and the dark-cycle container with gas from the external environment; (d) pump gas into the cavity of the other one of the light-cycle container and the dark-cycle container; (d) harvest a portion of the algae from the liquid; and (e) pump the liquid into the cavity of the other one of the light-cycle container and the dark-cycle container.

Some embodiments of the present apparatuses for algae aeration comprise: a tray having an upper side and a lower side, the tray defining a plurality of reservoirs, each reservoir having a closed top end and an open bottom end and configured such that if the tray is positioned with the lower side facing down in a container and liquid is introduced into the container up to the open bottom end of the reservoir, then the closed top end of the reservoir can trap air.

Any embodiment of any of the present methods, apparatuses, and systems can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The cells shown in FIGS. 19-22 and 29A-30 are drawn to scale.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a system that comprises a light-cycle container and a dark-cycle container, the system includes the specified elements but is not limited to having only those elements. For example, such a system could also include a control unit.

Further, a device or structure that is configured in a certain way is configured in at least that way, but it can also be configured in other ways than those specifically described.

Figure 1:
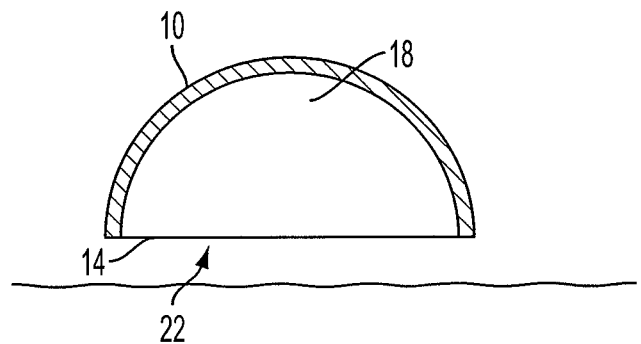
FIG. 1 depicts a cross-sectional view of an enclosure with an opening shown with liquid at a level below the top of the opening.
Figure 2:
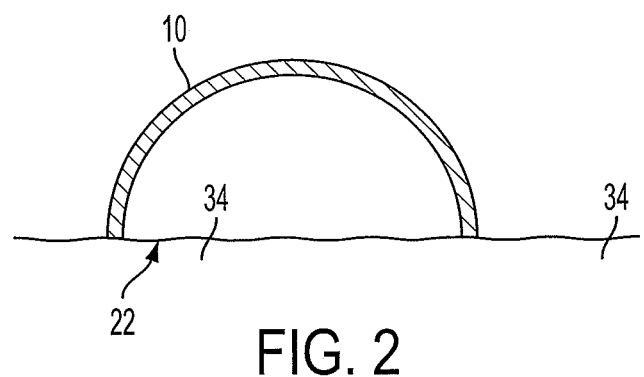
FIG. 2 depicts a cross-sectional view of the enclosure of FIG. 1 with the liquid at a level just above the top of the opening.
Figure 3:
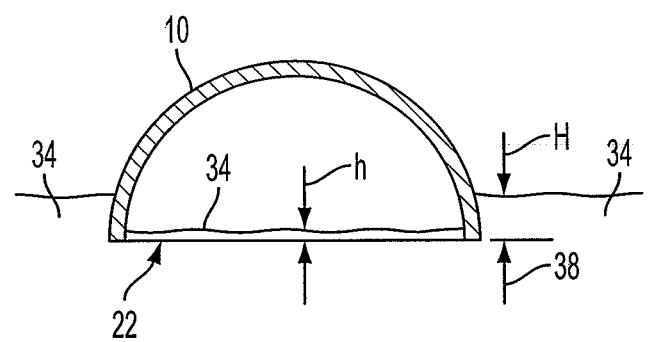
FIG. 3 depicts a cross-sectional view of the enclosure of FIG. 1 with the liquid at a level above the top of the opening.

Referring now to the drawings, and more particularly to FIGS. 1-3, shown therein and designated by the reference numeral 10 is an enclosure. More specifically, a cross-sectional view of enclosure 10 is shown. Enclosure 10 can be, for example, a semicircular cylinder with an open bottom 14 and closed ends 18. As shown, enclosure 10 is shown with an opening 22 having a top 26 and a bottom 30. Enclosure 10 is shown relative to a liquid 34, such as, for example, water, seawater, or any other suitable liquid. In FIG. 1, liquid 34 is shown at a level below the bottom of opening 22. In FIG. 2, liquid 34 is shown at a level just above the top of opening 22. In FIG. 3, liquid 34 is shown at a level that is a distance 38 above the top of opening 22.

The various embodiments of the present invention relate to a theory that was uncovered in the inventor's practice. The mathematic proof is shown below. By way of illustration, as the level of liquid 34 rises from the level of FIG. 1 to the level of FIG. 2, a volume of gas (e.g., air) 42 may be entrapped in the enclosure (e.g., at the top of the enclosure). As the level of liquid 34 rises from the level of FIG. 2 to the level of FIG. 3, the volume of air that is entrapped may be reduced due to the increased pressure. Such a reduction in volume is generally small enough to be negligible in applications to which the present embodiments may be used. In some embodiments or uses, however, the reduction in volume may not be negligible (e.g., it may be large enough to be important or advantageous to consider and/or quantify through calculation or measurement).

In FIG. 1, the level of liquid 34 is below the bottom of opening 22. The air inside the enclosure is still in fluid communication with air outside the enclosure. The pressure of the air inside the air enclosure is P0, one atmosphere (or otherwise equal to the pressure outside the enclosure), and the volume of the air above the highest opening level inside the air enclosure is V0.

In FIG. 2, the level of liquid 34 is just above the top of opening 22. The air inside the air enclosure is no longer in fluid communication with air outside the enclosure (e.g., liquid) 34 has effectively sealed the portion of the enclosure above opening 22. The pressure of the air inside the air enclosure is still P0, one atmosphere, and the volume of the air inside the air enclosure above the highest opening level is still V0.

In FIG. 3, the level of liquid 34 is a distance 38 above the top of opening 22 and the enclosure still contains the same molar amount of air as in FIGS. 1 and 2. As in FIG. 2, the air inside the enclosure is not in fluid communication with air outside the enclosure. As the level of liquid 34 rises, liquid enters the air enclosure due to the increased liquid pressure, and the liquid surface level inside the air enclosure rises a distance 38 (i.e., a height 38 of liquid 34 above the top of opening 22). The pressure of air inside the enclosure increases to P1, and the volume of air inside the enclosure decreases to V1, even while the molar amount of air inside the enclosure remains constant. The relationship between P0, V0, P1, and V1 is given by Equation (1):

$$P0*V0 = P1*V1 \quad (1)$$

where P0 is one atmosphere, about 1030 grams per square centimeter; V0 and V1 have units of cubic centimeters or milliliters; and P1 has units of grams per square centimeter.

In FIG. 3, the pressure balance at the surface of liquid 34 inside the enclosure is given by Equation (2):

$$P1 = P0 + p*H - p*h \quad (2)$$

where p is the density of the liquid, in grams per cubic centimeter; h is the height of the liquid above the top of opening 22, in centimeters; and H is the height of the liquid 34 above the top of opening 22 outside the enclosure, in centimeters.

Combining Equations (1) and (2) results in Equation (3):

$$V0 - V1 = p*(H-h)*V1/P0 \quad (3)$$

Because the volume of the air in the enclosure is reduced due to the higher liquid level, we have Equations (4) and (5):

$$h > 0 \quad (4)$$

$$V1 < V0 \quad (5)$$

Combining Equations (3), (4), and (5), results in Equation (6), from which Equations (7) can be derived:

$$V0 - V1 < p*H*V0/P0 \quad (6)$$

$$(V0 - V1)/V0 < p*H/P0 \quad (7)$$

Formula (7) shows that, between FIGS. 2 and 3, the volume of the air entrapped in the enclosure is reduced by no more than p*H/P0 as the liquid level rises to H above the top of opening 22.

The "Entrapped Air Volume Compression Index" (EAVC) is defined in this disclosure by Equation (8):

$$EAVC = p*H/P0 \quad (8)$$

where p is the density of the liquid, in grams per cubic centimeter; H is the height of the liquid 34 above the top of opening 22 outside the enclosure, in centimeters; P0 is one atmosphere, 1030 grams per square centimeter. For example, for fresh water, p=1 gram per cubic centimeter.

When the liquid level increases to H=100 cm above the top of opening 22, the EAVC is given by Equation (10):

$$EAVC = p*H/P0 = 1 \times 100/1030 = 9.7\% \quad (10)$$

As shown, when H=100 cm, the volume of the entrapped air is compressed by no more than 9.7%. Table 1 illustrates EAVC for fresh water at a variety of values of H.

TABLE 1

EAVC For Fresh Water at Various Values of H

| H (centimeter) | EAVC |
| --- | --- |
| 10 | 1% |
| 20 | 1.9% |
| 30 | 2.9% |
| 40 | 3.9% |
| 50 | 4.9% |
| 60 | 5.8% |
| 70 | 6.8% |
| 80 | 7.8% |
| 90 | 8.7% |
| 100 | 9.7% |

For seawater, p=1.03 gram per cubic centimeter. Table 2 illustrates EAVC for salt water (e.g., ocean salt water) at a variety of values of H.

TABLE 2

EAVC For Salt Water at Various Values of H

| H (centimeter) | EAVC |
|---|---|
| 10 | 1% |
| 20 | 2% |
| 30 | 3% |
| 40 | 4% |
| 50 | 5% |
| 60 | 6% |
| 70 | 7% |
| 80 | 8% |
| 90 | 9% |
| 100 | 10% |

Figure 4:
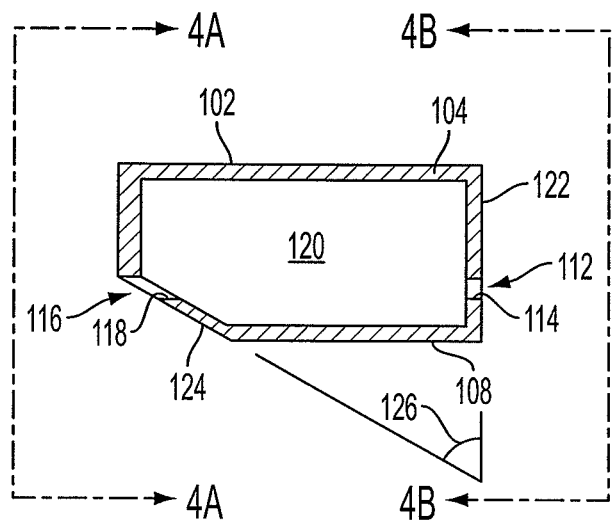
FIG. 4 depicts an end view of an embodiment of a rectangular plant-aeration cell.
Figure 4A:
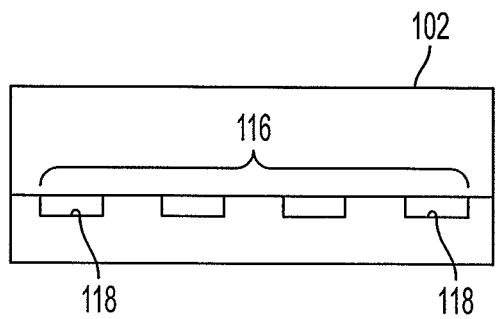
FIGS. 4A and 4B depict side views of the aeration cell of FIG. 1.
Figure 4B:
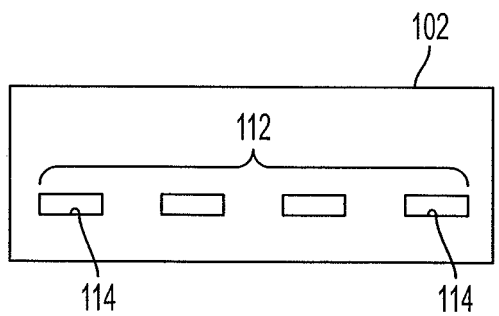

Referring now to FIGS. 4-8, components of plant-aeration systems and plant aeration systems 100, 100a, 100b, and 100c are shown. FIGS. 4, 4A, and 4B depict a plant-aeration cell 102 is shown. Plant-aeration cell 102 may be interchangeably referred to as cell 102 or aeration cell 102. Cell 102 comprises an air reservoir unit 104 that comprises material that is gas-impermeable (e.g., such that air reservoir unit 104 is gas-impermeable or impermeable to gas such as, for example, air, oxygen, or the like). In the embodiment shown, cell 102 also comprises a root holder unit 108 connectable (and shown connected) to air reservoir unit 104. Root holder unit 108 comprises a first set 112 of one or more openings 114 and a second set 116 of one or more openings 118. In the embodiment shown, the air reservoir unit and the root holder unit form, when connected to each other (e.g., as shown), a reservoir 120 from which gas cannot escape when the reservoir is occupied by liquid having a level that is above the openings 114, 118 in the first and second sets of openings 112, 116.

In the embodiment shown, air reservoir unit 104 and root holder unit 108 are integrally connected to one another. In the embodiment shown, first set 112 of openings comprises a plurality of openings 114, and second set 116 of openings comprises a plurality of openings 118. In other embodiments, first set 112 of openings can comprise (or consist of) one opening 114, and/or second set 116 can comprise (or consist of) one opening 118. As shown, plant-aeration cell 102 possesses a generally rectangular shape when viewed from above (see, e.g., FIG. 8). As best shown in FIG. 4, root holder unit 108 includes a first side 122 in which the one or more openings 114 in the first set 112 are disposed, and a second side 124 in which the one or more openings 118 in the second set 116 are disposed, and the second side is oriented at a non-zero angle 126 relative to the first side (e.g., first side 122 and second side 124 are not parallel). In other embodiments of root holder unit 108, first side 122 and second side 124 are parallel to each other.

Figure 5:
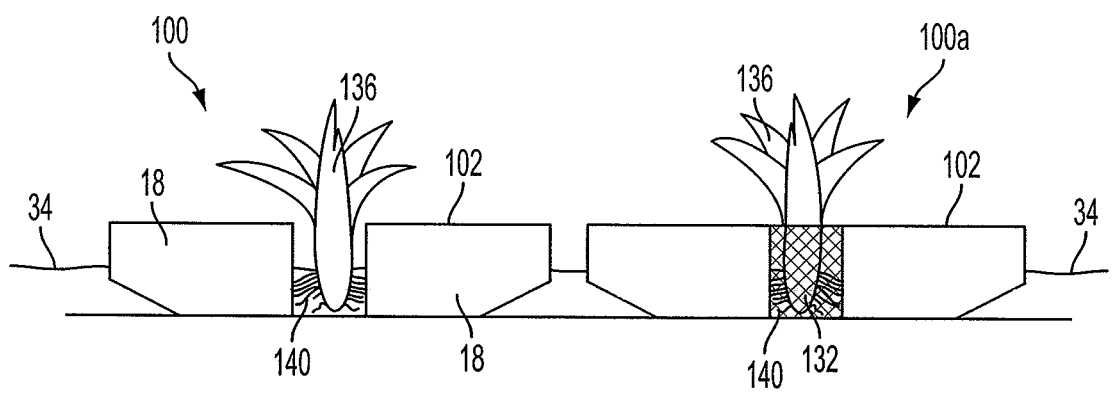
FIG. 5 depicts an example of a configuration for a plurality of the cells of FIG. 1.

As shown in FIG. 5, the root or roots 140 of a plant positioned near plant-aeration cell 102 may extend from the outside of the cell into reservoir 120 through, for example, one or more openings 114. In operation or use of the cell, the water (or the liquid in question) in which the cell is placed may move up and down on a regular periodic or sporadic basis between relatively higher and lower levels (e.g., in response to the tide, waves, or the like). When the water level is higher than all of the openings 114 and 118 of the (lower) root holder unit (including when the water is higher than the air reservoir unit), air is entrapped in the (upper) air reservoir unit, and water (e.g., fresh water) flows into the root holder unit. Based on the theory of operation described above, the water level in the air reservoir unit will only rise by a relatively small distance as a result, and roots in the root holder unit will still have access to the entrapped air. When the water level falls below or is lower than some portion of the openings 114 and 118 (e.g., lower than the all of the openings 114 and 118), air (e.g., fresh air) will enter the air reservoir unit through the exposed opening(s) through which flow is possible, and some water will be entrapped in the root holder unit (e.g., in the portion of the root holder unit below the openings 114 and 118). Plant roots will then have access to the air in the air reservoir unit and to the (entrapped) water in the root holder unit. In both situations (in other words, in both water level conditions), the plant roots will have access to air and water such that a relatively consistent environment with both air and water can be achieved for plant roots to grow.

In some embodiments, plant-aeration cell 102 can comprise an anti-mold agent disposed on at least a portion of an exterior surface of the plant-aeration cell and/or on at least a portion of an interior surface of the plant-aeration cell. In some embodiments, plant-aeration cell 102 includes an exterior surface having a white or off-white color (e.g., R:G:B Decimal values in the respective ranges 200-255: 200-255:200-255, such as, for example, 255:255:255, 245: 245:220, or the like), and/or an interior surface having a black or dark color (e.g., R:G:B Decimal values in the respective ranges 0-150:0-150; 0-150, such as, for example, 0:0:0, 0:0:150, 50:80:50, or the like).

Figure 7:
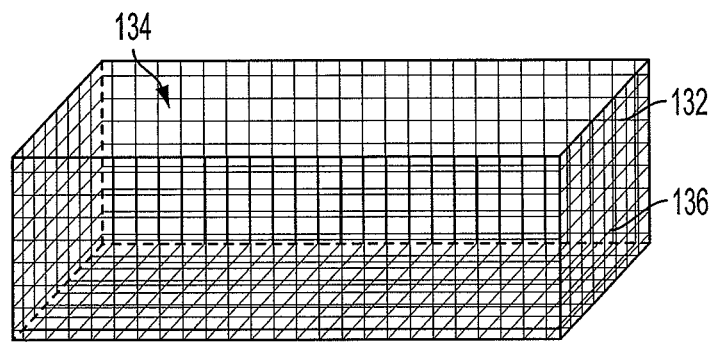
FIG. 7 depicts a rectangular plant-growing cell for use with the cell of FIG. 4.

FIG. 7 depicts a plant-growing cell 132 configured to be disposed in operative relation with plant-aeration cell 102. Plant-growing cell 132 may be interchangeably referred to as cell 132 or aeration cell 132. Plant-growing cell 132 defines an open area 134 in which one or more plants can grow, and, in the embodiment shown, the plant-growing cell comprising mesh material 136. The plant-growing cell is configured such that a plant (such as a tree or the like) can be placed with its base (e.g., roots, trunk, and/or the like) at least partially in open area 134 such that one or more roots of the plant extend out of the plant-growing cell (e.g., through openings in and through the mesh material). In other embodiments, the plant-growing cell can comprise a solid material with one or more openings defined through the solid material such that roots can extend through the openings in the solid material in a similar fashion to that described for the depicted embodiment that comprises mesh material.

FIG. 5 depicts two embodiments of a plant-aeration system 100 and 100a. System 100 comprises two cells 102 in spaced-apart relation such that a plant 136 can be disposed between cells 102 such that roots 140 of the plant can extend through at least one opening (114 and/or 118) of the first and second sets 112, 116 of openings. More particularly, in the embodiment shown, the cells are configured and positioned such that roots 140 of the plant can extend through the first set 112 of openings 114 of each of cell 102. In this way, if a liquid 34 reaches a level such that the liquid occupies each reservoir at a level above openings 114 and 118, air cannot escape (e.g., is trapped in) the reservoir such that the roots 140 can access both water and air in the reservoir.

Figure 8:
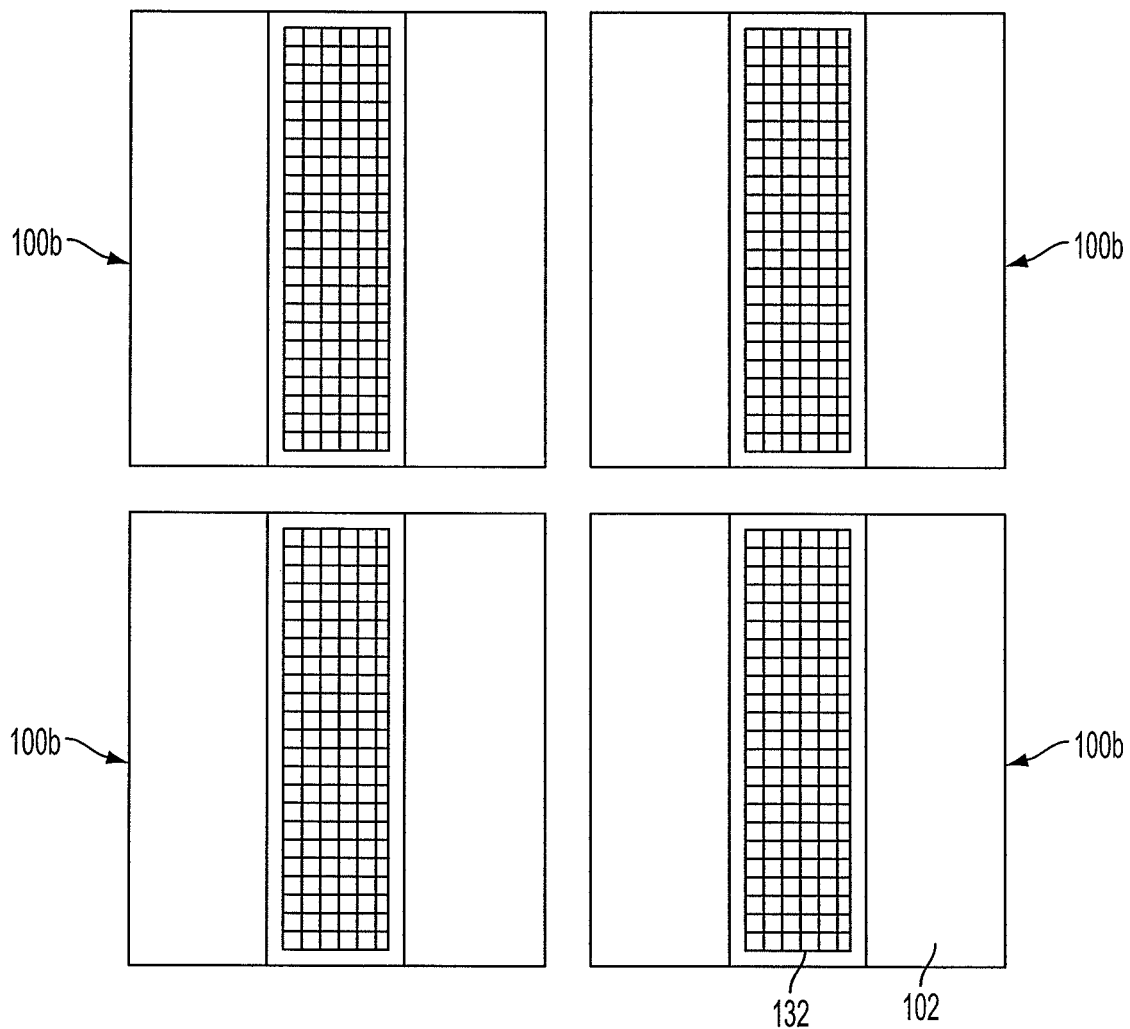
FIG. 8 depicts a top view of an example of a configuration for a plurality of rectangular aeration cells of FIG. 4 and a plurality of rectangular plant-growing cells of FIG. 7.

System 100a comprises two plant-aeration cells 102 (e.g., a first cell 102 and an additional cell 102) and a plant-growing cell 132 coupled and/or disposed adjacent (e.g., between) plant-aeration cells 102. In this embodiments, roots 140 of plant 136 can extend through openings in the mesh material of the plant-growing cell and through the openings in the plant-aeration cells in a fashion similar to that described for system 100. In some embodiments, systems 100 and/or 100a further comprise one or more additional plant-aeration cells 102 (e.g., aligned end 18 to end 18, such as in a row) and/or one or more additional plant-growing cells 132, such as, for example, as shown in FIG. 8.

Figure 6:
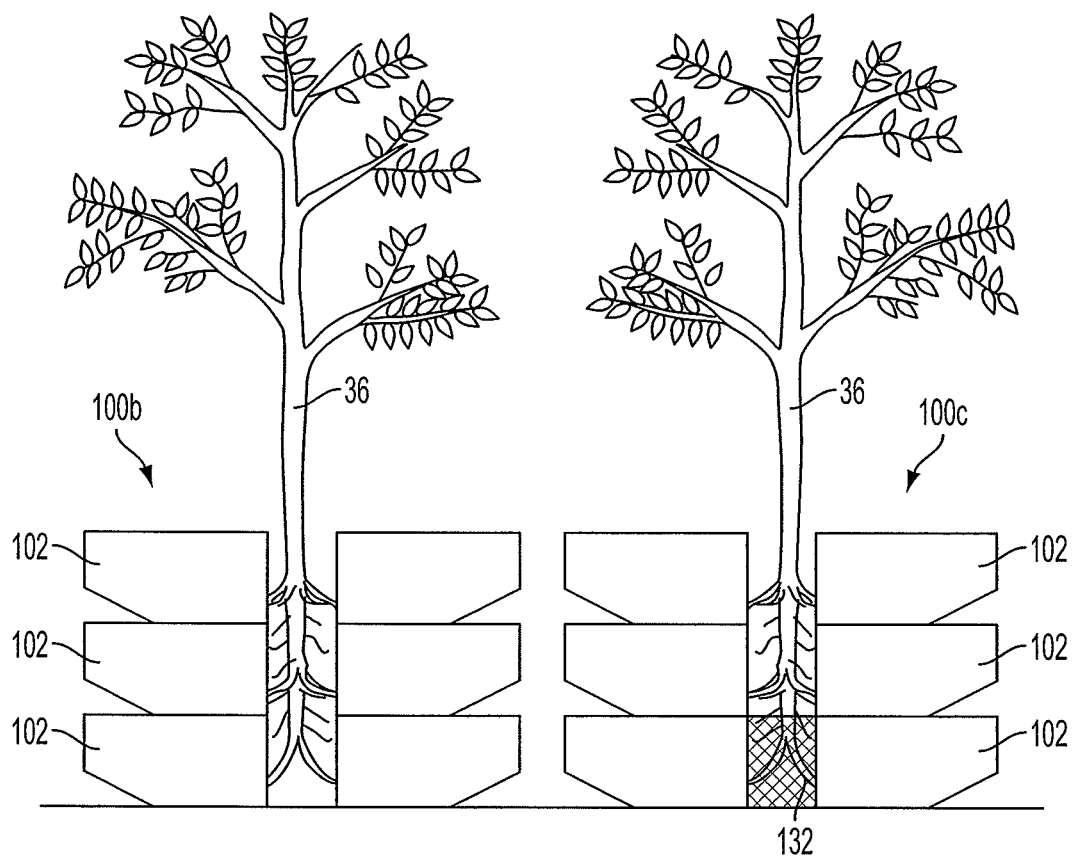
FIG. 6 depicts another example of a configuration for a plurality of the cells of FIG. 1 shown with plants.

FIG. 6 depicts two more embodiments of plant-aeration systems 100b and 100c. System 100b is similar to system 100 in that it does not comprise any plant-growing cells 132. System 100b instead comprises one or more (a plurality of) additional plant-aeration cells 102 (e.g., in operative relation to a first plant-aeration cell 102) in a stacked configuration. In this way, system 100b has a greater height and may be better suited to plants 36 that are taller (e.g., trees, bamboo, or the like). For example, system 100b may be better suited to receive roots for a taller root mass such that the plant may be better aerated and/or better supported by system 100b. System 100c is similar to system 100a in that it comprises one or more (a plurality of) additional plant-aeration cells 102 (e.g., in operative relation to a first plant-aeration cell 102) in a similar fashion, and for similar function, as system 100b. In some embodiments, system 100c may further comprise one or more additional plant-growing cells 132.

In such embodiments of the present plant aeration systems (e.g., 100, 100a, 100b, 100c), each plant-aeration cell 102 can be coupled to one or more other plant-aeration cells 102 and/or to one or more plant-growing cells 132, such as, for example, by way of screws, rivets, wires, a connecting frame, interlocking elements, or any other suitable means.

Figure 9:
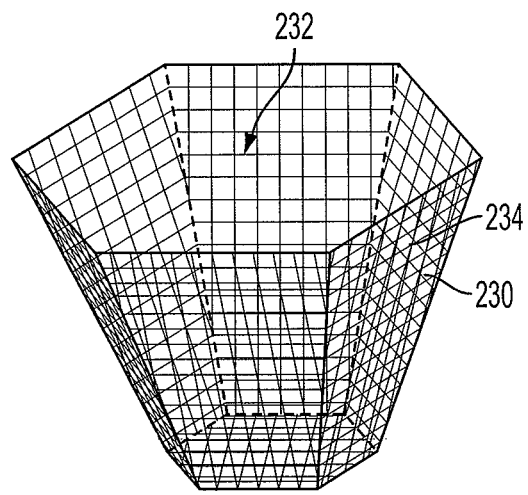
FIG. 9 depicts a hexagonal plant-growing cell.
Figure 10A:
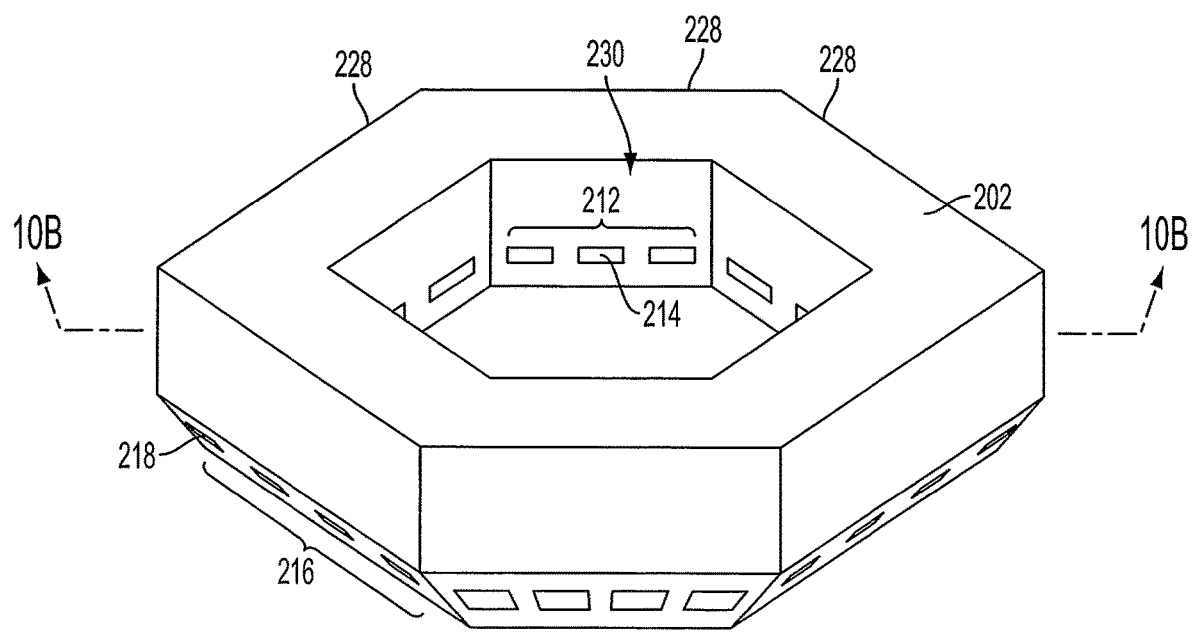
FIG. 10A depicts a perspective view of an embodiment of hexagonal plant-aeration cell that can be used with the hexagonal plant-growing cell of FIG. 8.
Figure 10B:
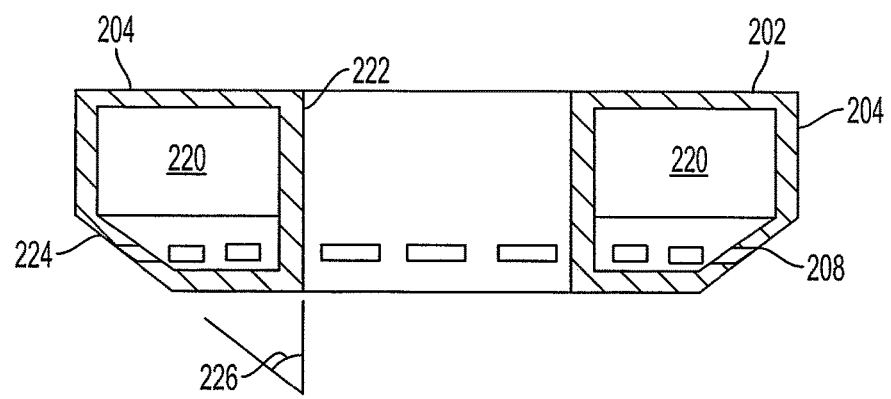
FIG. 10B depicts a cross-sectional view of the cell of FIG. 10A.
Figure 11:
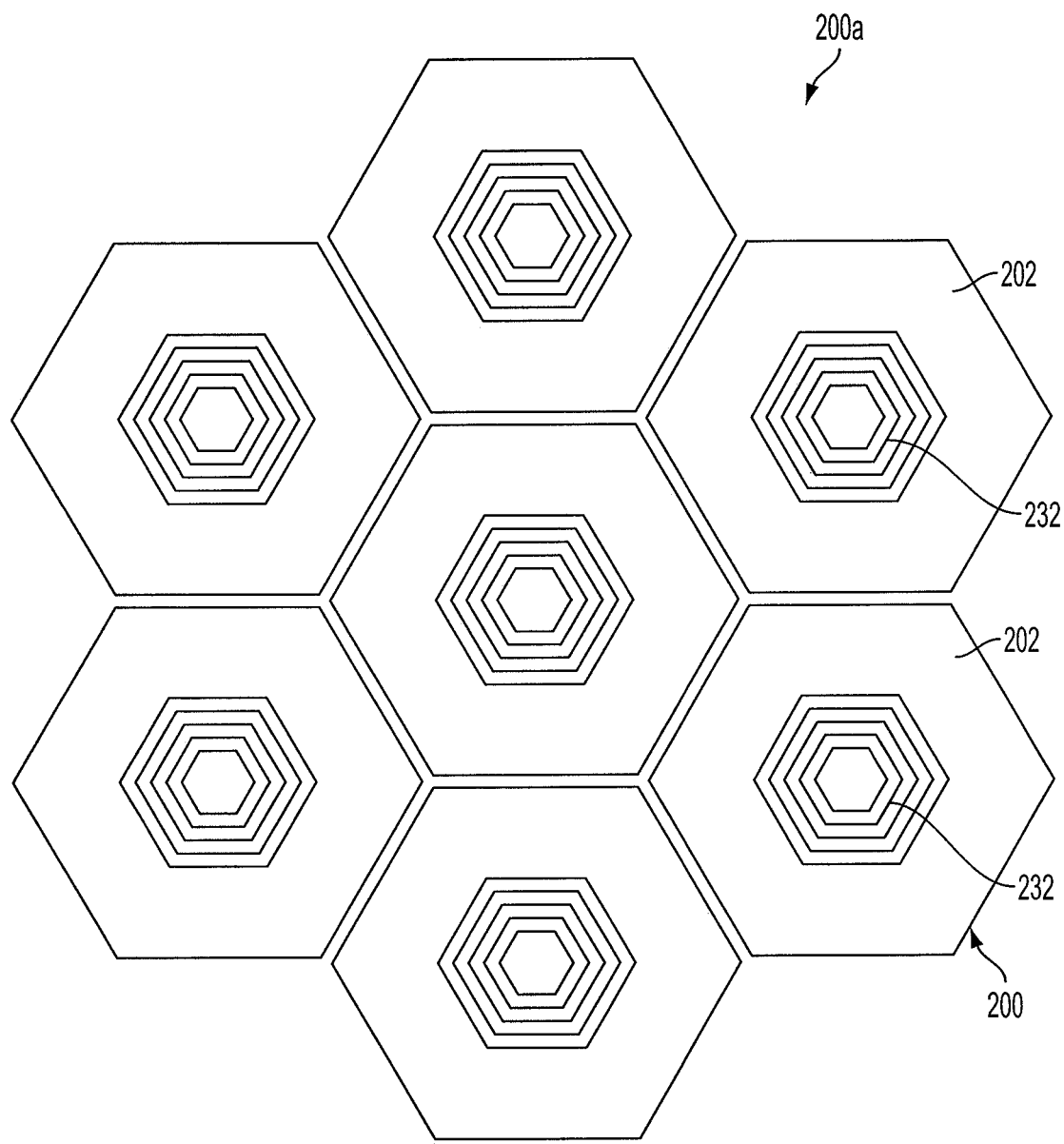
FIG. 11 depicts a top view of an example of a configuration for a plurality of hexagonal aeration cells of FIGS. 10A and 10B and a plurality of hexagonal plant-growing cells of FIG. 9.
Figure 12:
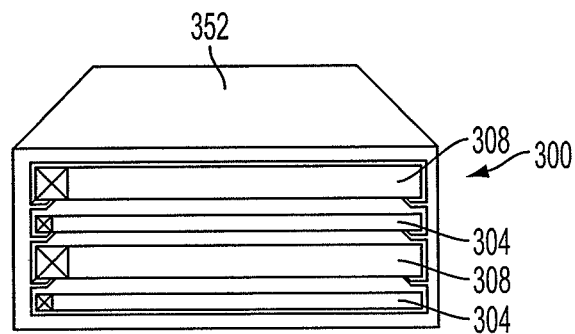
FIG. 12 depicts a perspective view of an embodiment of a rectangular plant-aeration tray system having a plurality of root holder trays and air reservoir trays.
Figure 13A:
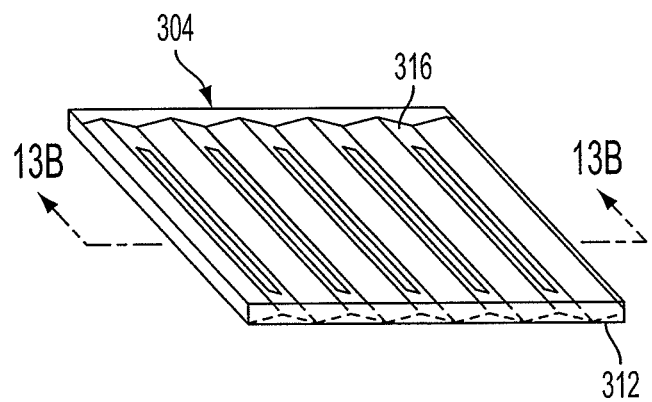
FIG. 13A depicts a rectangular root holder tray for use with the system of FIG. 5.
Figure 13B:
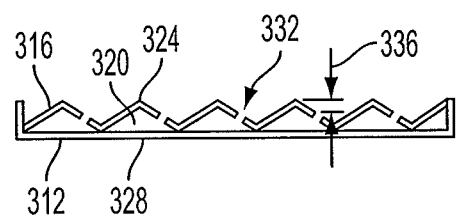
FIG. 13B depicts a cross-sectional view of the root holder tray of FIG. 13A taken along the line 13B-13B of FIG. 13A.
Figure 14A:
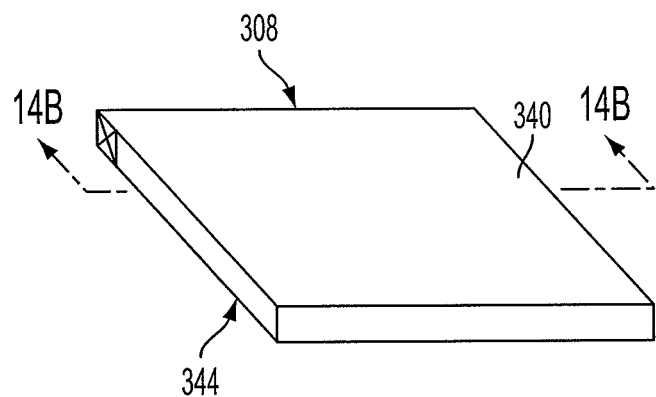
FIG. 14A depicts a rectangular air reservoir tray for use with the system of FIG. 5.
Figure 14B:
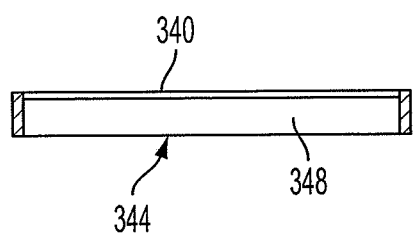
FIG. 14B depicts a cross-sectional view of the air reservoir tray of FIG. 14A taken along the line 14B-14B of FIG. 14A.
Figure 15:
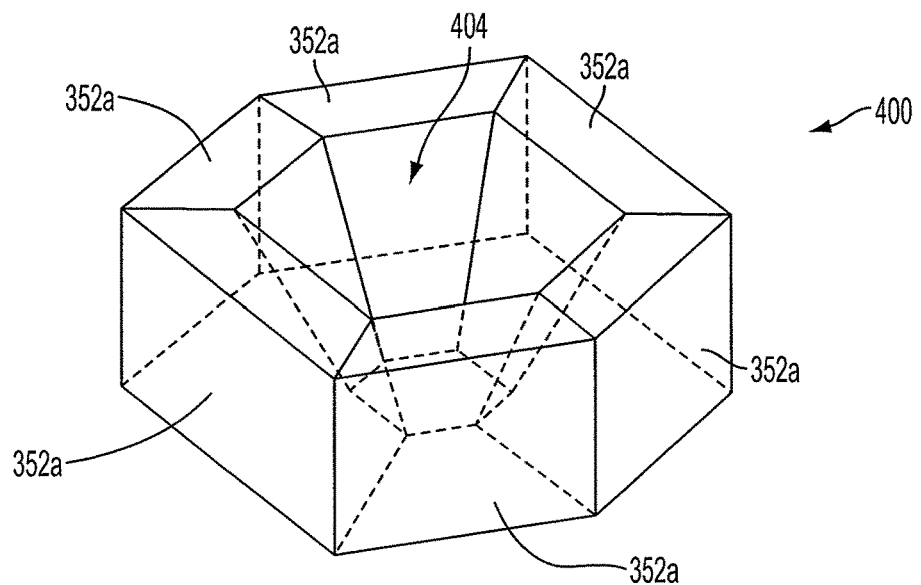
FIG. 15 depicts an embodiment of a hexagonal plant-aeration tray system comprising six frame segments.
Figure 16:
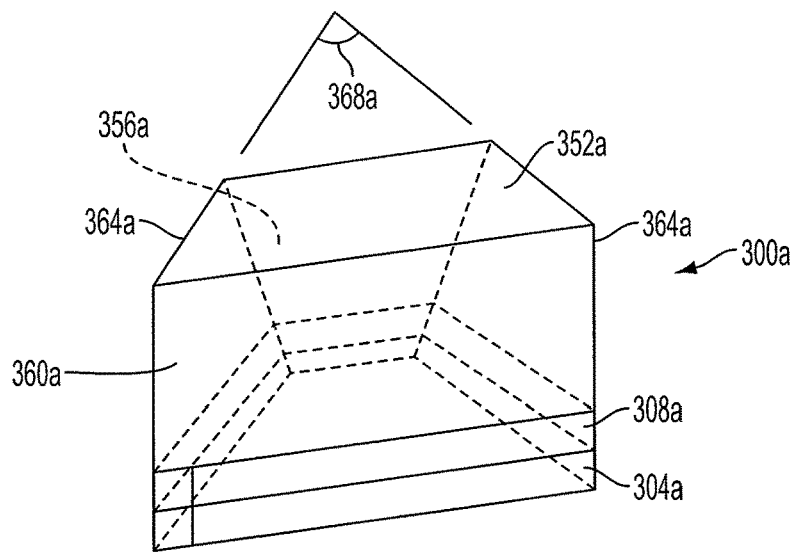
FIG. 16 depicts a perspective view of a frame segment of the system of FIG. 8.
Figure 17:
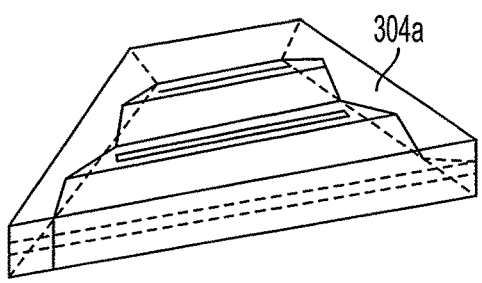
FIG. 17 depicts a perspective view of a hexagonal root holder tray for use with the frame segment of FIG. 15.
Figure 18:
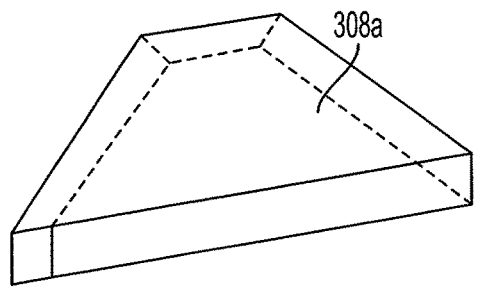
FIG. 18 depicts a perspective view of a hexagonal air reservoir tray for use with the frame segment of FIG. 15.
Figure 19:
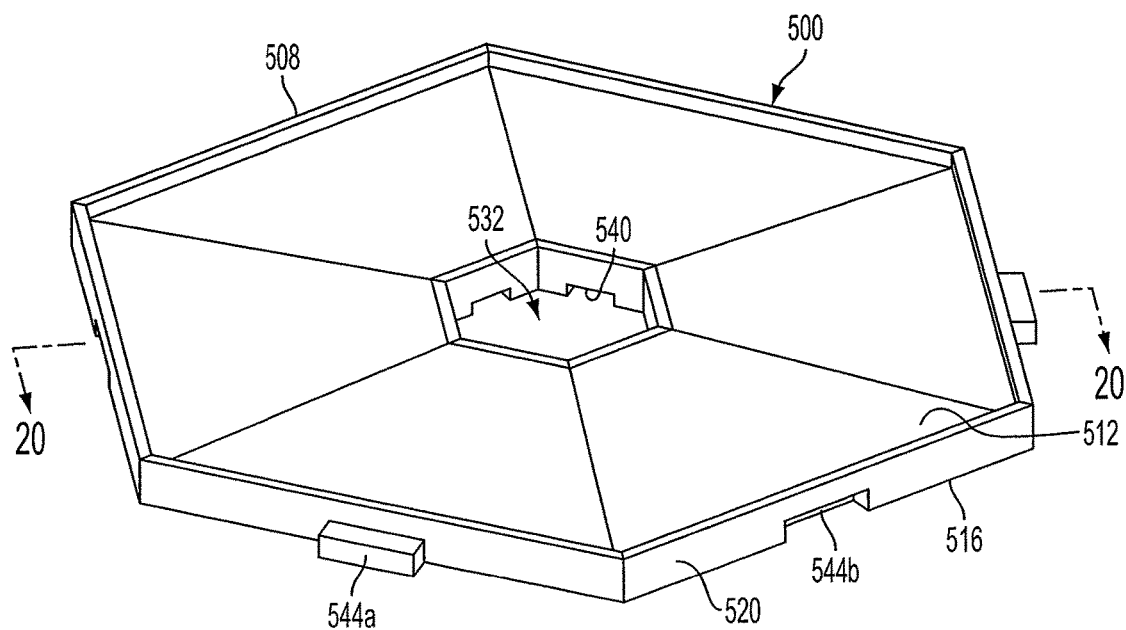
FIG. 19 depicts another embodiment of hexagonal plant-aeration cell.
Figure 20:
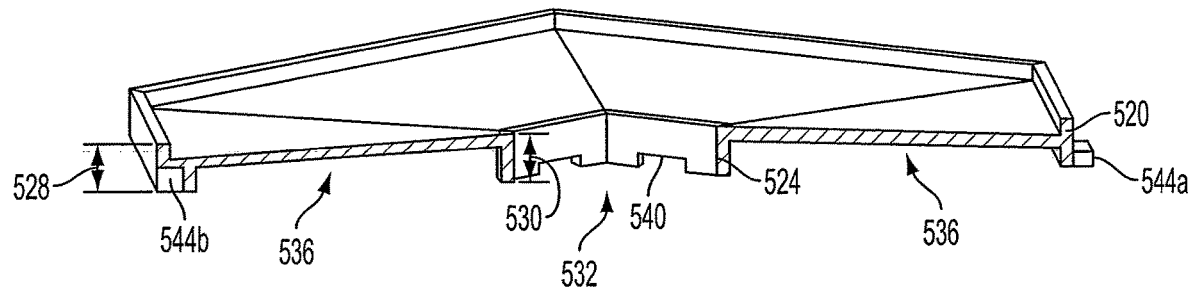
FIG. 20 depicts a cross-sectional view of the cell of FIG. 19 taken along the line 20-20 of FIG. 19.

Referring now to FIGS. 9-11, components of plant-aeration systems 200 and 200a are shown. FIGS. 10A and 10B depict a second embodiment of a plant-aeration cell 202. Plant-aeration cell 202 may be interchangeably referred to as cell 202 or aeration cell 202. Plant-aeration cell 202 is substantially similar to plant-aeration cell 102, with some primary differences noted below. Cell 202 comprises an air reservoir unit 204 that comprises material that is gas-impermeable (e.g., such that air reservoir unit 204 is gas-impermeable or impermeable to gas such as, for example, air, oxygen, or the like). In the embodiment shown, cell 202 also comprises a root holder unit 208 connectable (and shown connected) to air reservoir unit 204. Root holder unit 208 comprises a first set 212 of one or more openings 214 and a second set 216 of one or more openings 218. In the embodiment shown, the air reservoir unit and the root holder unit form, when connected to each other (e.g., as shown), a reservoir 220 from which gas cannot escape when the reservoir is occupied by liquid having a level that is above the openings 214, 218 in the first and second sets of openings 212, 216.

In the embodiment shown, air reservoir unit 204 and root holder unit 208 are integrally connected to one another. In the embodiment shown, first set 212 of openings comprises a plurality of openings 214, and second set 216 of openings comprises a plurality of openings 218. In other embodiments, first set 212 of openings can comprise (or consist of) one opening 214, and/or second set 216 can comprise (or consist of) one opening 218. As best shown in FIG. 10B, root holder unit 208 includes a first side 222 in which the one or more openings 214 in the first set 212 are disposed, and a second side 224 in which the one or more openings 218 in the second set 216 are disposed, and the second side is oriented at a non-zero angle 226 relative to the first side (e.g., first side 222 and second side 224 are not parallel).

In some embodiments, plant-aeration cell 202 can comprise an anti-mold agent disposed on at least a portion of an exterior surface of the plant-aeration cell and/or on at least a portion of an interior surface of the plant-aeration cell. In some embodiments, plant-aeration cell 202 includes an exterior surface having a white or off-white color (e.g., R:G:B Decimal values in the respective ranges 200-255: 200-255:200-255, such as, for example, 255:255:255, 245: 245:220, or the like), and/or an interior surface having a black or dark color (e.g., R:G:B Decimal values in the respective ranges 0-150:0-150; 0-150, such as, for example, 0:0:0, 0:0:150, 50:80:50, or the like).

Plant-aeration cell 202 is also different from plant-aeration cell 102 in certain ways. For example, plant-aeration cell 202 possesses a generally hexagonal shape when viewed from above. In particular, in the embodiment shown, plant-aeration cell 202 includes six sections 228 connected to each other and defining a central open space 230 bordered by the first set 212 of one or more openings 214.

FIG. 9 depicts a plant-growing cell 232 configured to be disposed in operative relation with plant-aeration cell 202. Plant-growing cell 202 may be interchangeably referred to as cell 232 or aeration cell 232. Plant-growing cell 232 defines an open area 234 in which one or more plants can grow, and, in the embodiment shown, the plant-growing cell comprising mesh material 236. The plant-growing cell is configured such that a plant (such as a tree or the like) can be placed with its base (e.g., roots, trunk, and/or the like) at least partially in open area 234 such that one or more roots of the plant extend out of the plant-growing cell (e.g., through openings in and through the mesh material. In other embodiments, the plant-growing cell can comprise a solid material with one or more openings defined through the solid material such that roots can extend through the openings in the solid material in a similar fashion to that described for the depicted embodiment that comprises mesh material.

FIG. 11 depicts two embodiments of plant-aeration systems 200 and 200a. System 200 comprises a plant-aeration cell 202 and a plant-growing cell 232. System 200a comprises one or more (e.g., a plurality of) additional plant-aeration cells 202 and/or one or more (e.g., a plurality of) additional plant-growing cells 232.

Some embodiments of the present methods for plant-aeration comprise: providing a plant-aeration cell 102; disposing the plant-aeration cell in an environment exposed to (or that exposes the cell to) liquid (e.g., liquid 34) continuously or at least intermittently (e.g., in a tidal region in which a liquid such as seawater rises and falls periodically) such that: (a) a plant root or roots extend through the one or more openings (114 or 224) in the first set (112 or 212) and into the reservoir (120 or 220); and (b) liquid (e.g., liquid 34) can flow into the reservoir (120 or 220) to a level above the openings (114 and 118; or 214 and 218) in the first and second sets (112 and 116, or 212 and 216) such that gas is trapped in the reservoir (120 or 220) above the level of the liquid (e.g., liquid 34).

Referring now to FIGS. 12-14B, an embodiment is shown of a rectangular plant-aeration tray system 300 (e.g., a system for the aeration of one or more plants) having a plurality of root holder trays 304 and air reservoir trays 308. In the embodiment shown, each root holder tray 304 comprises a bottom layer 312 and a top layer 316. Bottom layer 312 and top layer 316 cooperatively define a plurality of root reservoirs 320 such that each root reservoir 320 has a top 324 and a bottom 328. As also shown, the top layer 316 of the root holder tray 304 has a plurality of openings 332, and each opening 332 is in communication with a root reservoir 320 and disposed a distance 336 below the top of the root reservoir 320. Each air reservoir tray 308 has a closed top end 340 and an open bottom end 344 such that the air reservoir tray defines an air reservoir 348.

System 300 further comprises a tray rack 352 configured to be coupled to one or more root holder trays 304 and one or more air reservoir trays 308 such that the one or more root holder trays and the one or more air reservoir trays are in a stacked, alternating orientation (e.g., with an air reservoir tray 308 directly above a corresponding root holder tray 304, and so on, as shown). In the embodiment shown, system 300 is configured such that if a root holder tray 304 is disposed in tray rack 352, an air reservoir tray 308 is disposed in tray rack 352 above root holder tray 304, and the tray rack is submersed in liquid, then at least a portion of each root reservoir 320 of the root holder tray 304 will fill with the liquid and the closed top end 340 of the air reservoir tray will trap air (e.g., between the top of the air reservoir and the top of an opening 332).

Referring now to FIGS. 15-18, a second embodiment of a plant-aeration tray system 300a, and a configuration 400 for a plurality of plant-aeration t systems 300a, are shown. System 300a is substantially similar to system 300. For example, system 300a comprises one or more root holder trays 304a, one or more air reservoir trays 308a, and a tray rack 352a. However, system 300a (and accordingly, root holder tray(s) 304a and air reservoir tray(s)) is provided with an overall shape that is different from the overall shape of system 300. In particular, system 300a is provided with a truncated wedge shape such that a plurality (e.g., six) of tray racks 352a can be coupled to one another in a ring configuration 400 with an open space 404 in the middle of the ring configuration. As shown, tray rack 352a has a rear surface 356a, a front surface 360a, and two sides 364a. Sides 364a are not parallel, and instead are angularly disposed relative to one another at a non-zero angle 368a. In the embodiment shown, angle 368a is equal to about sixty (60) degrees. In other embodiments, system 300a can be configured such that any suitable number of systems 300a can be coupled to one another to form a ring configuration in which the sides 364a of one tray rack 352a are each substantially parallel to a side 354a of an additional (e.g., adjacent) tray rack 352a. For example, where system 300a is configured such that nine (9) systems 300a can be coupled to one another to form a ring configuration, angle 364a can be about 40 degrees.

Referring now to FIGS. 19-22, an embodiment is shown of a plant-aeration cell 500, as well as a configuration 504 for a plurality of plant-aeration cells 500. Plant-aeration cell 500 comprises a body 508 having a top side 512, a bottom side 516, an outer sidewall 520, and an inner sidewall 524. Outer sidewall 520 has a height 528 and at least partially defines an outer perimeter of plant-aeration cell 500. Inner sidewall 524 has a height 530 and defines an inner passage 532 extending through the plant-aeration cell from the top side to the bottom side. Outer and inner sidewalls 520 and 524 cooperatively define an air reservoir 536 between the outer perimeter and inner passage 532. Additionally, inner sidewall 524 has one or more root openings 540 extending through inner sidewall 524 between air reservoir 536 and inner passage 532. In the embodiment shown, body 508 also has one or more connectors 544 configured to couple plant-aeration cell 500 to an adjacent plant-aeration cell. More particularly, body 508 includes male connectors 544a and female connectors 544b in an alternating arrangement spaced around the outer perimeter of the body. In this way, a male connector 544a of a cell 500 can be coupled to a female connector 544b of an adjacent cell 500. In the embodiment shown, plant-aeration cell 500 is configured such that if the plant-aeration cell is positioned on a flat surface with bottom side 516 facing down and water is introduced onto the flat surface such that the water reaches a level above root openings 540, gas (e.g., air) will be trapped in air reservoir 536.

Figure 21:
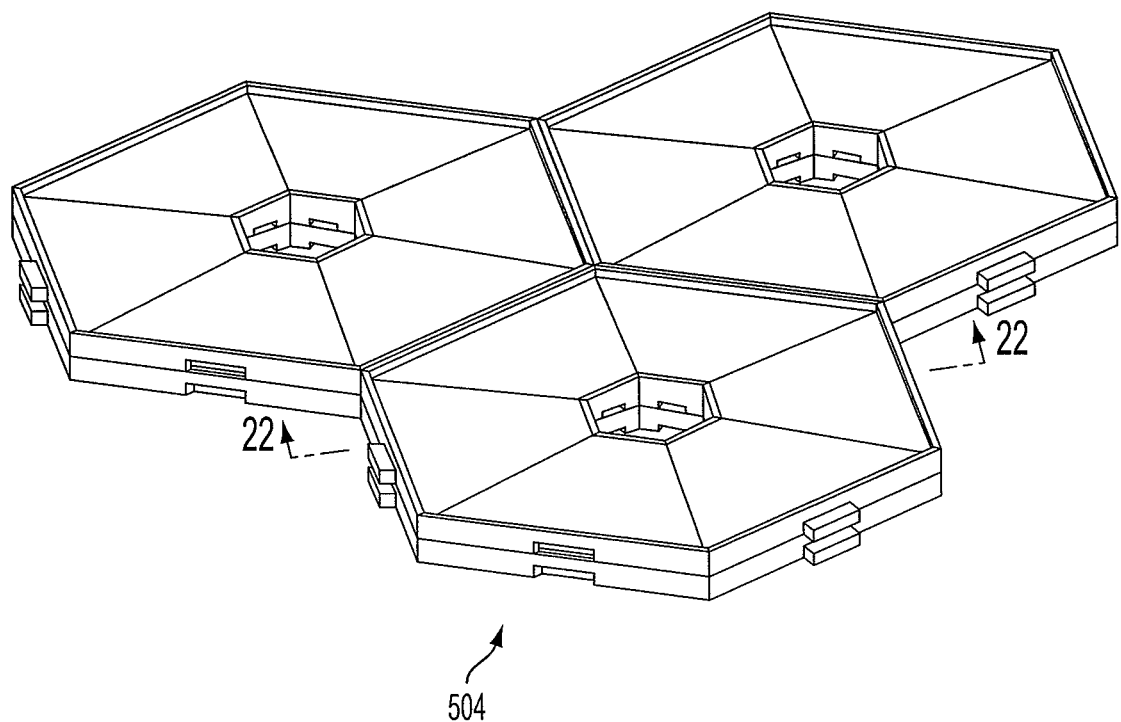
FIG. 21 depicts an example of a configuration for a plurality of hexagonal plant-aeration cells of FIG. 20.
Figure 22:
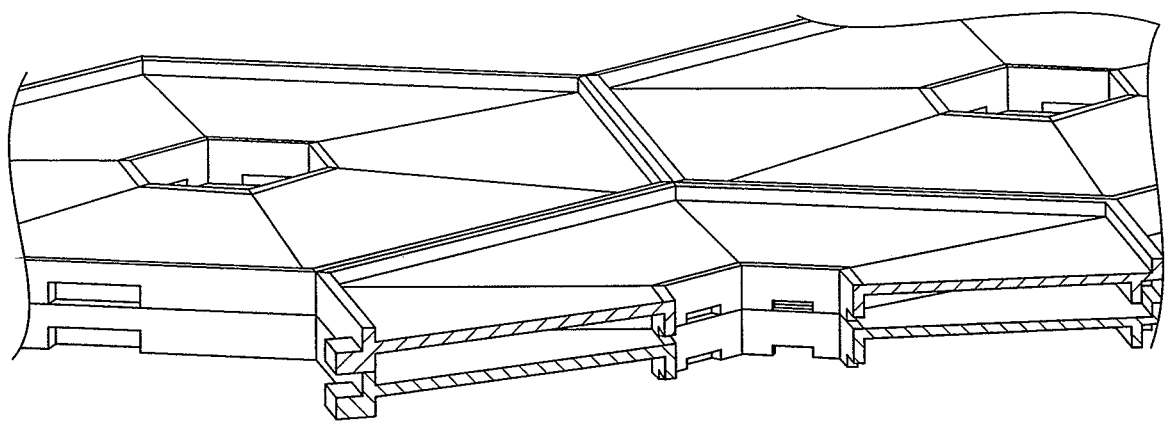
FIG. 22 depicts a partially cross-sectional view of the configuration of FIG. 21 taken along the line 21-21 of FIG. 21.

In some embodiments, plant-aeration cell 500 is configured to be stackable. For example, FIGS. 21 and 22 depicts a plurality of plant-aeration cells coupled to adjacent cells by way of connectors 544 and stacked on top of one another. In this way, as plants get taller and require more support, and/or as root masses of plants get larger and require more aeration, additional layers of plant-aeration cells 500 can be added to provide the additional support and/or aeration.

Figure 23A:
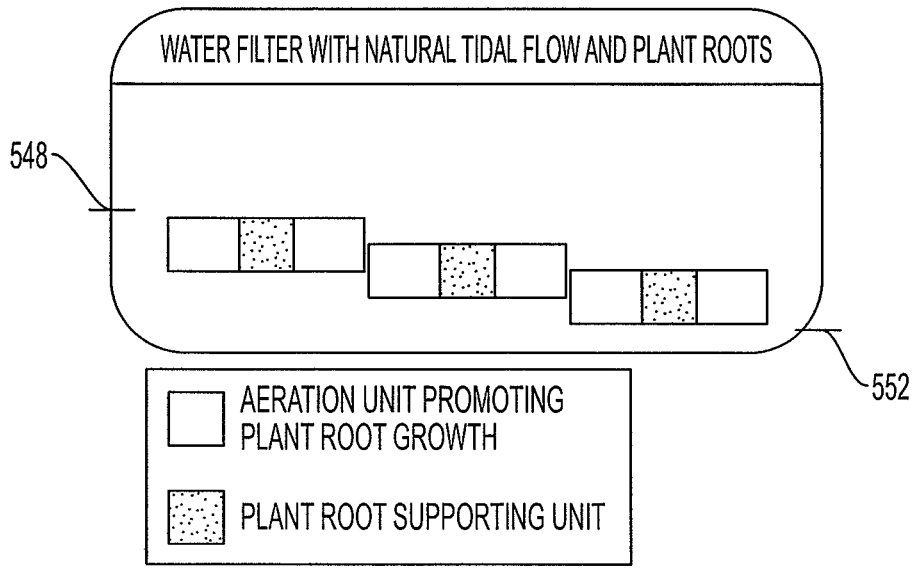
FIGS. 23A and 23B depict two embodiments of methods of environmental remediation.
Figure 23B:
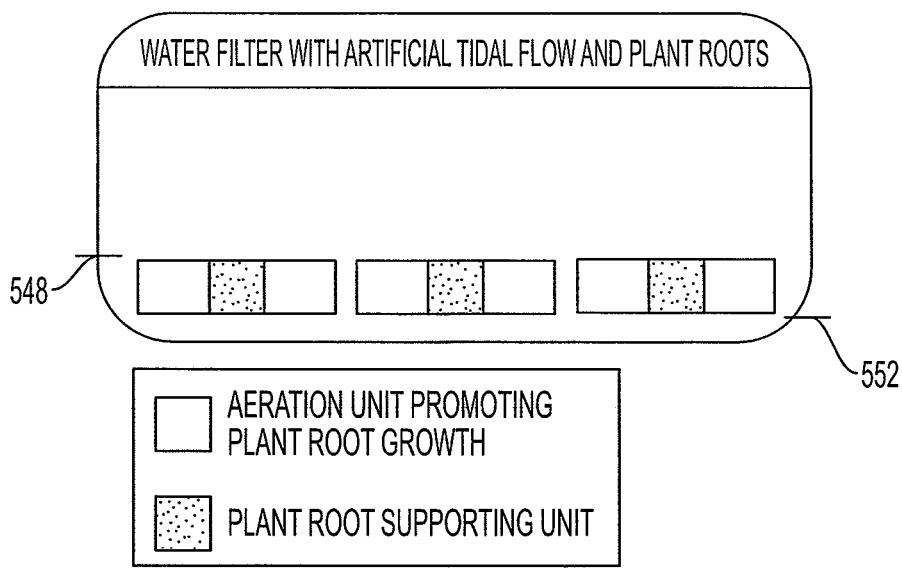

Referring now to FIGS. 23A and 23B, embodiments of methods of environmental remediation are conceptually illustrated. In the method illustrated with reference to FIG. 23A, the method comprises the steps of disposing a plurality of plant-aeration cells along a coast between a high-tide point 548 and a low-tide point 552. High tide point 548 refers to the high-tide level and lateral position, and low-tide 544 refers to the low-tide level and lateral position. That is, the plant-aeration cells can be positioned such that when water is at the high-tide level, the water is above the top of the openings and air is trapped in the cell; and when water is at the low-tide level, the water is below the top of the openings such that air can circulate in and out of the cell. Each plant-aeration cell can comprise any of the plant-aeration cells (e.g., 102, 400, etc.) described in this disclosure, or equivalents. For example, each plant-aeration cell can comprise: an air reservoir unit comprising material that is gas-impermeable; and a root holder unit connectable to the air reservoir unit, the root holder unit comprising a first set of one or more openings and a second set of one or more openings; the air reservoir unit and the root holder unit forming, when connected to each other, a reservoir from which gas cannot escape when the reservoir is occupied by liquid having a level that is above the openings in the first and second sets of openings. In the embodiment illustrated, the method further comprises disposing a plurality of plants 136 adjacent the plurality of plant-aeration cells 102 such that at least one root from each plant extends through at least one opening in the first and second sets of openings of at least one plant-aeration cell (e.g., in a manner illustrated in FIG. 5). Plants 136 can comprise, for example, corn and/or any other plants that can absorb toxins and/or contaminants from the water. In the embodiment of FIG. 23A, the plant-aeration cells are disposed on a slope, such as, for example, on a beach or river bank. FIG. 23B is substantially similar to FIG. 23A, with the primary exception that cells 102 are positioned at about the same level with one another such that artificial tide patterns may be created between high-tide point 548 and low-tide point 552 (e.g., by pumping water into and out of a reservoir to simulate the rise and fall of water in natural tidal action).

The various aeration cells, root holder trays, air reservoir trays, and/or tray racks described above can comprise any suitable materials. Some embodiments of the aeration cells, root holder trays, and/or tray racks may be made from material(s) that resist chemical erosion that would otherwise occur in an acidic or otherwise caustic environment, such as, for example, ceramic material. An example of a suitable ceramic material from which to make embodiments of the aeration cells, root holder trays, and/or tray racks is a composition comprising greater than or equal 28% by weight $Al_2O_3$ relative to the total weight of the composition, and less than or equal to 68% by weight $SiO_2$ relative to the total weight of the composition, which composition, after being formed into an appropriate shape, is cured for a suitable time and at a suitable temperature, such as for 24 hours at 1180-1250 degrees Celsius. Other examples of suitable ceramic materials include pottery, bricks, and tiles; cements; clay minerals, such as kaolinite; aluminum dioxide; advanced ceramics, such as silicon carbide and tungsten carbide; crystalline ceramics; non-crystalline ceramics (glasses); transition metal oxides; and, to the extent not covered by those previously listed—barium titanate; bismuth strontium calcium copper oxide, boron nitride, ferrite, lead zirconate titanate, magnesium diboride, porcelain, silicon aluminum oxynitrides, silicon carbide, silicon nitride, steatite, titanium carbide, uranium oxide, yttrium barium copper oxide, zinc oxide, zirconium dioxide, and partially stabilized zirconia. The material(s) from which some embodiments of the aeration cells, root holder trays, and/or tray racks may be made may, in addition to providing resistance to chemical corrosion, also provide resistance to ultraviolet (UV) light; and/or semi-rigidity or substantial rigidity. For example, some embodiments of the present aeration cells, root holder trays, air reservoir trays, and/or tray racks may comprise polymers or engineering plastics such as acrylonitrile butadiene styrene (ABS), polycarbonates (PC), polyamides (PA), polybutylene terephthalates (PBT), polyethylene terephthalates (PET), polyphenylene oxides (PPO), polysulphones (PSU), polyetherketones (PEK), and polyetheretherketones (PEEK).

Figure 24:
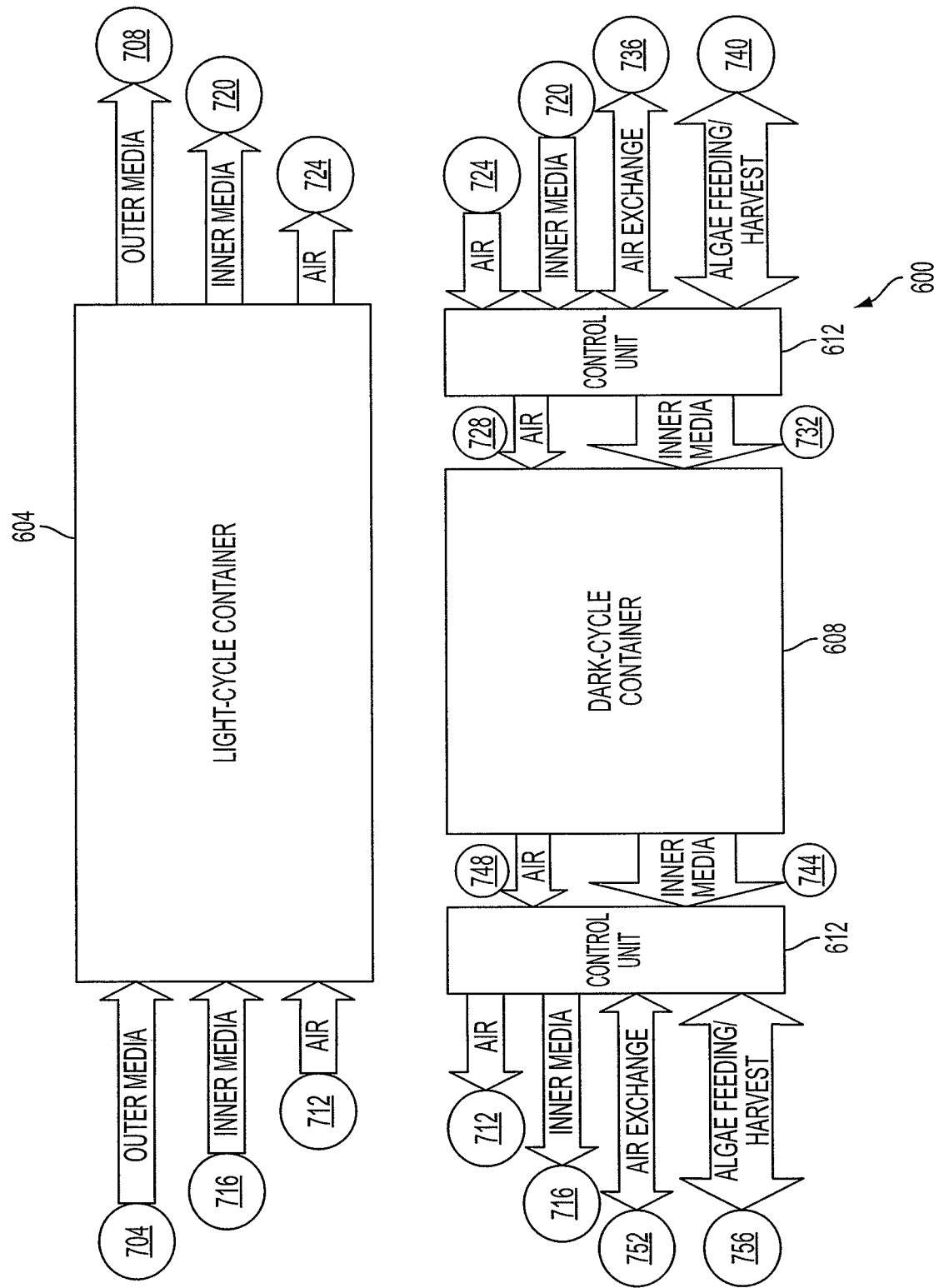
FIG. 24 depicts an embodiment of a system for algae cultivation.
Figure 25:
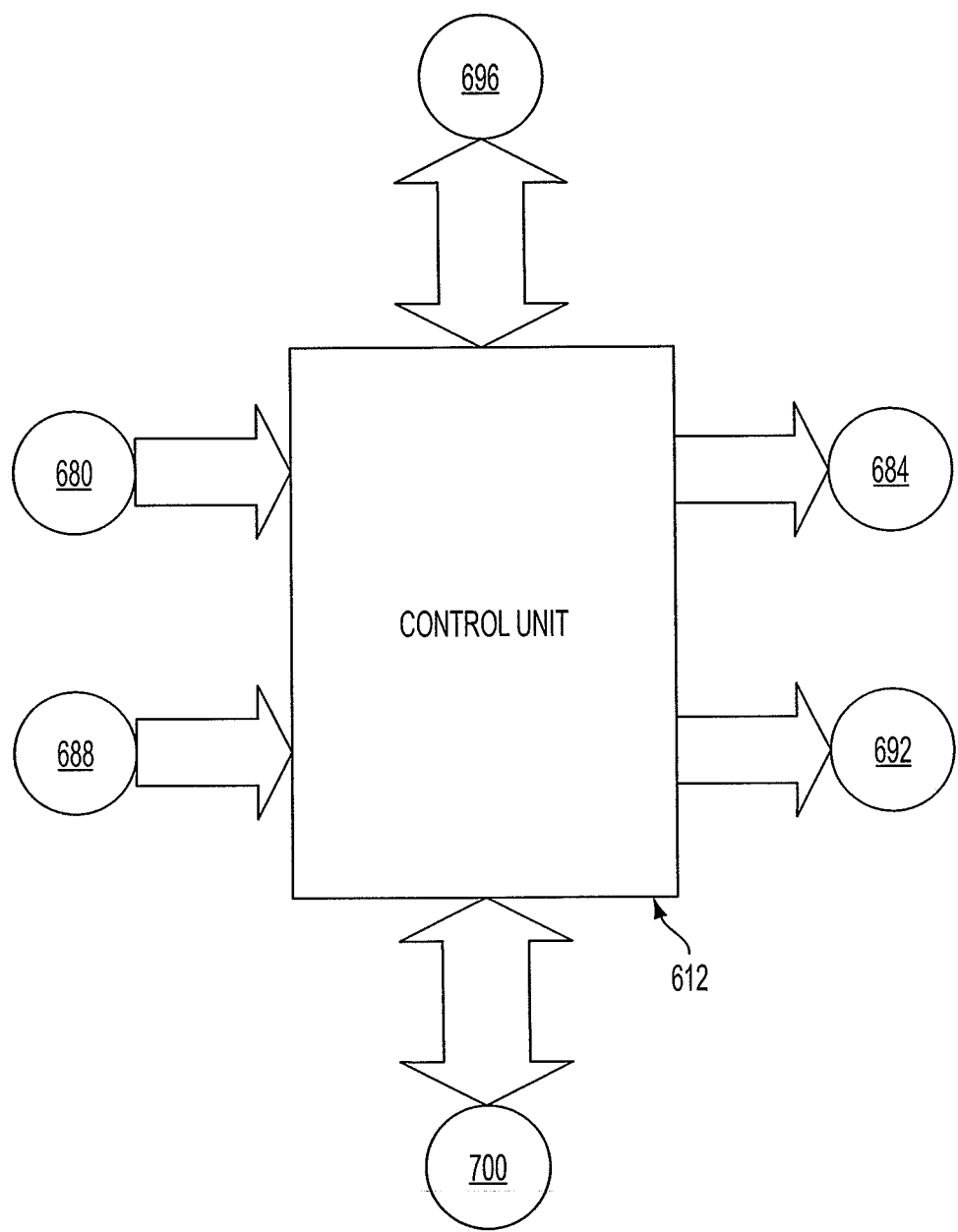
FIG. 25 depicts a conceptual block view of a control unit for use with the system of FIG. 24.
Figure 27:
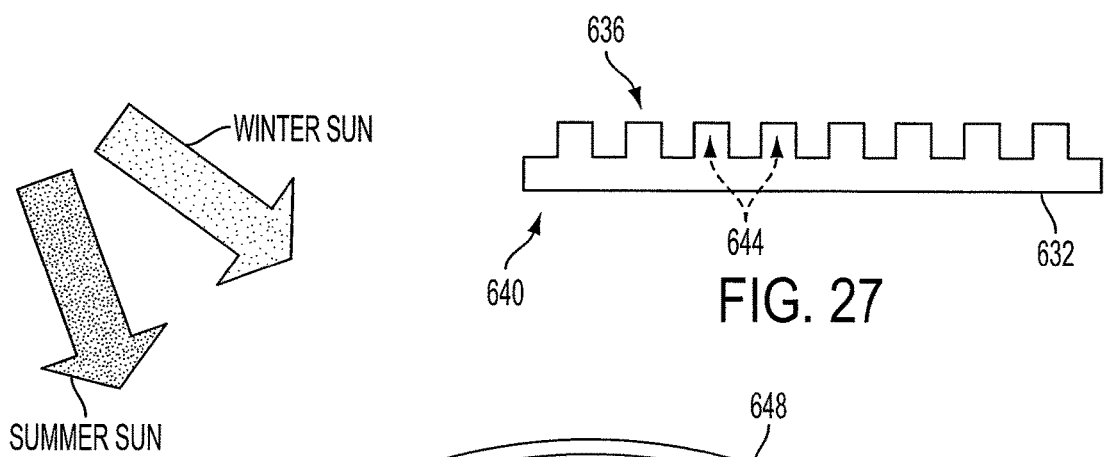
FIG. 27 depicts a side cross-sectional view of a reservoir tray for use with the light-cycle container of FIG. 26.
Figure 26:
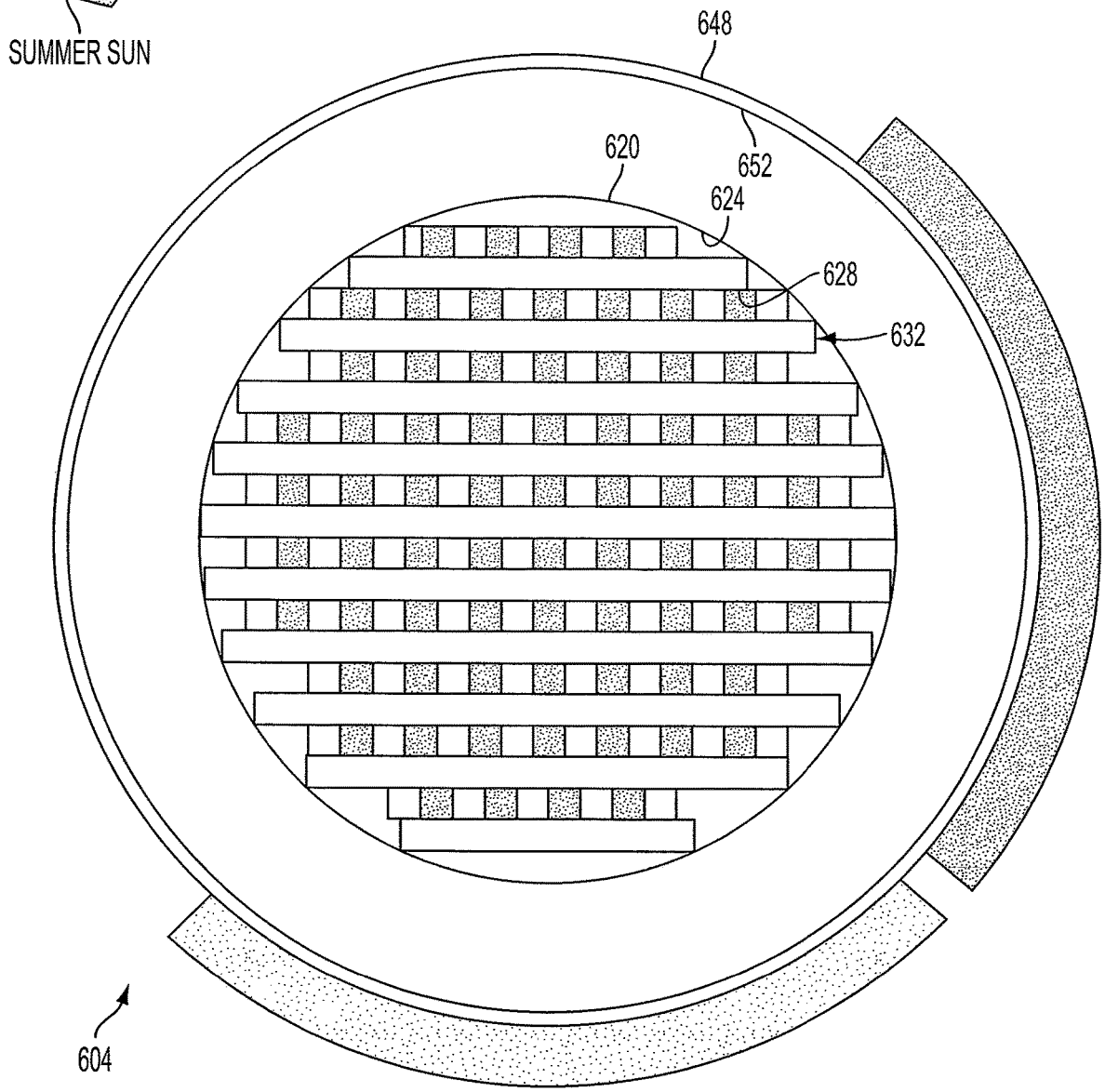
FIG. 26 depicts a cross-sectional view of a light-cycle container for use with the system of FIG. 24.
Figure 28A:
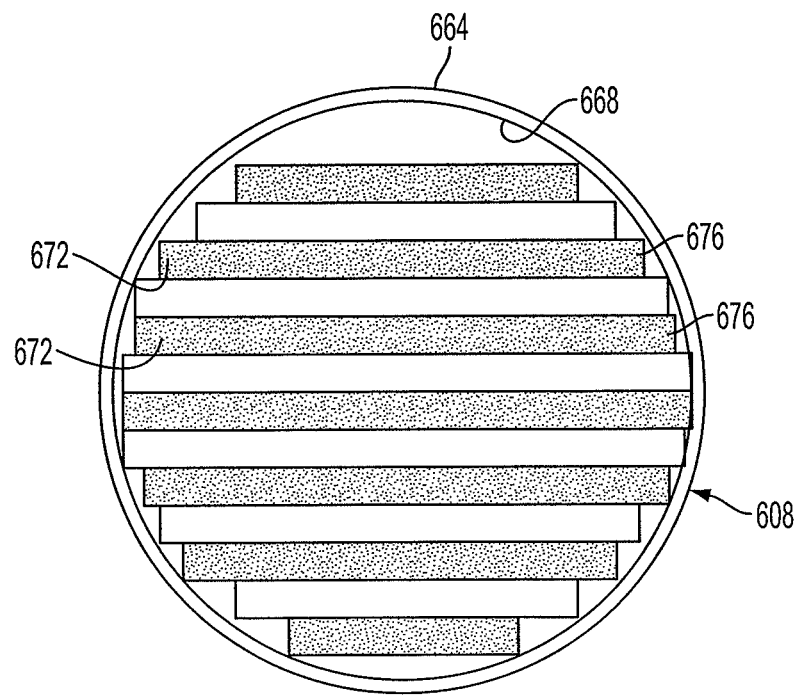
FIGS. 28A and 28B depict cross-sectional views of two embodiments of dark-cycle containers for use with the system of FIG. 24.
Figure 28B:
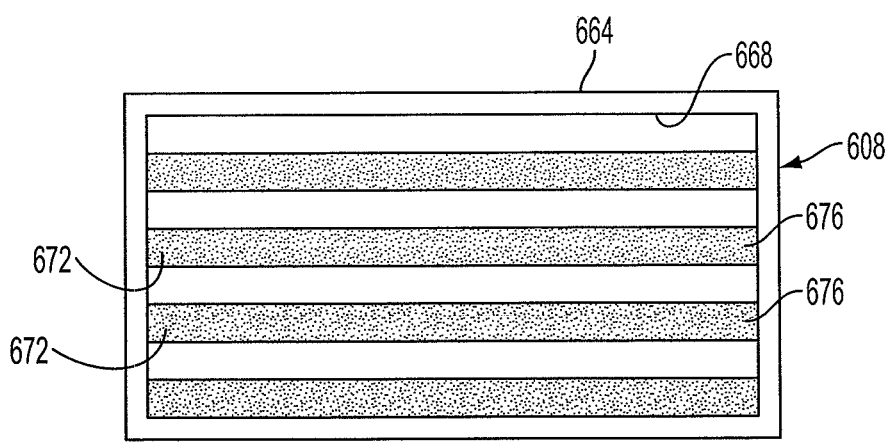

Referring now to FIGS. 24-28B, a system 600 for algae cultivation is shown. FIG. 24 depicts a flowchart illustrating the function and components of one embodiment of system 600. More particularly, system 600 comprises a light-cycle container 604, a dark-cycle container 608, and a control unit 612. FIG. 25 depicts a block diagram of control unit 612; FIG. 26 depicts a cross-sectional view of light-cycle container 604; FIG. 27 depicts a reservoir tray 616 for use with embodiments of light-cycle container 604 and/or dark-cycle container 608; and FIGS. 28A and 28B depict two embodiments of dark-cycle container 608.

Light-cycle container 604 has a sidewall 620 defining a cavity 624, and has a plurality of air reservoirs 628. Light-cycle container 604 is also configured such that: (a) if the light-cycle container is filled with liquid, at least a portion of the plurality of air reservoirs will trap gas; and (b) if light is incident on the light-cycle container, at least a portion of the incident light is permitted to enter the cavity through the sidewall. More particularly, in the embodiment shown, light-cycle container 604 is adapted to receive a plurality of reservoir trays 632 each having an upper side 636 and a lower side 640, the tray defining a plurality of air reservoirs 644, each air reservoir 644 having a closed top end and an open bottom end and configured such that if the tray is positioned with the lower side facing down in a container and liquid is introduced into the container up to the open bottom end 640 of the air reservoir, then the closed top end of the air reservoir can trap gas (e.g., air, carbon dioxide, and the like) for exchange with algae. More particularly, each reservoir tray is configured to have a generally hollow bottom 636 and a gas-impervious top 640. Each reservoir tray 632 can be configured to transmit at least a portion (up to all) visible light incident on the tray. Light-cycle container 604 is configured to receive a plurality of trays 632 with hollow bottom 636 facing down and gas-impervious top 640 facing up, such that if cavity 624 contains gas (e.g., air) and is then filled with liquid (e.g., water or water containing algae), air will be trapped in air reservoirs 644 as cavity 624 fills. Air reservoirs 644 can be elongated ridge-like reservoirs, or can be shorter or square-shaped discrete reservoirs. Air reservoirs 644 can, for example, be about one inch wide and/or about 1 inch square.

In the embodiment shown, light-cycle container 604 further comprises an outer sidewall 648 defining an outer cavity 652 around sidewall 620 such that sidewall 620 is an inner sidewall and cavity 624 is an inner cavity. As shown, trays 632 and air reservoirs 644 are disposed in inner cavity 624. Outer sidewall 648 is configured such that if light is incident on the light-cycle container (e.g., on outer sidewall 648), at least a portion of incident ultraviolet (UV) light is not permitted to enter the outer cavity through the outer sidewall and at least a portion of incident non-UV light is permitted to enter the outer cavity through the outer sidewall. Stated another way, in the embodiment shown, outer sidewall 648 is configured to filter at least some portion of UV light that is incident on the light-cycle container (e.g., on the outer sidewall). In some embodiments, outer cavity 652 can be filled with fresh water and inner cavity 624 can be filled with saltwater, such that if light is incident on the light-cycle container, then at least a portion of the incident light is internally reflected within the outer sidewall such that the internally-reflected portion of incident light is not permitted to exit the outer sidewall once it has passed through the outer sidewall (e.g., at least some portion of the incident light is transmitted through the outer sidewall and/or the inner sidewall and is totally internally reflected). To this end, in the embodiment shown, light-cycle container 604 further comprises a reflector 656 having an uneven or rough reflective inner surface 660 that assists with reflecting incident light back into the outer cavity and/or inner cavity in a distributed fashion that may increase the portion (up to all) of light that is totally internally reflected within the outer sidewall (e.g., within the inner sidewall).

Outer sidewall 648 can be cylindrical (e.g., circular, square, rectangular, etc.) and can comprise a water-tight (liquid-impervious) material with a relatively high light transmission (high light conductivity) and relatively low heat transmission (low thermal conductivity), such as, for example, plastic, glass, or the like. In this way, outer sidewall 648 can: collect sunlight, contain or hold a liquid (outer media such as fresh water) in outer cavity 652, and/or provide some thermal insulation from the environment outside outer sidewall 648 such that thermal energy is at least partially contained within outer cavity 652 and/or such that thermal energy is at least partially excluded from outer cavity 652. Outer cavity 652 is configured to contain or hold an outer media. The outer media can comprise, for example, fresh water or other clear liquid having a relatively low reflective index (e.g., relative to other liquids). In operation, the outer media (e.g., fresh water) can: absorb ultraviolet light, transmit visible light, collect heat or thermal energy, control or mediate temperature fluctuations, and/or contribute to total-internal reflection within the outer sidewall and/or within the inner sidewall. In some embodiments, spacers or other supporting structure (not shown) is disposed between the outer sidewall and the inner sidewall to maintain the spacing between the inner and outer sidewalls to support the outer cavity in the depicted configuration. Such spacers can comprise, for example, optic fibers, bundles of optic fibers, glass, plastic, or other transparent substantially rigid material (e.g., that can be scratch-resistant). In some embodiments, such spacers can be somewhat flexible, compressible, resilient, and/or elastic.

Inner sidewall 620 can be cylindrical (e.g., circular, square, rectangular, etc.) and can comprise a water-tight (liquid-impervious) and/or substantially rigid material with a relatively high light transmission and a relatively low heat transmission, such as, for example, plastic, glass, or the like. Inner sidewall 620 is configured to contain or hold an inner media (e.g., saltwater), contribute to total-internal by trapping light between an inner media with a higher refractive index and an outer media with lower refractive index, and/or provide thermal insulation between the outer cavity and the inner cavity. Inner media can have a higher refractive index than the outer media and can comprise, for example, saltwater or any other suitable liquid with a relatively higher refractive index than the outer media. For example, the refractive index of the inner media can have a refractive index equal to, or between any of about: 5, 10, 15, 20, 25, 30, 35, 40, 45, 50, 55, and/or 60 percent greater than the refractive index of the outer media. The inner media can, for example, transmit visible light, contribute to total-internal reflection within the inner cavity, transport algae, and/or provide or carry nutrients for algae suspended in the inner media.

Dark-cycle container 608 also has a sidewall 664 defining a cavity 668, and has a plurality of air reservoirs 672. As with light-cycle container 604, dark-cycle container 608 is configured to receive a plurality of trays 676 defining reservoirs 672. Dark-cycle container 608 is also configured such that: (a) if the dark-cycle container is filled with liquid, at least a portion of the plurality of air reservoirs will trap gas; and (b) if light is incident on the dark-cycle container, at least a portion of the incident light is not permitted to enter the cavity through the sidewall. Stated another way, sidewall 664 is configured to be translucent or opaque so as to block some portion (up to all) of incident light from entering cavity 668. As noted above for the light-cycle container, sidewall 664 can be substantially rigid. Trays 676 can be substantially similar to tray 632 shown in FIG. 27 and/or can be any other suitable tray configuration that permits the dark-cycle container to function and/or be configured as described in this disclosure.

Sidewall 664 can be cylindrical (e.g., circular, square, rectangular, etc.) and can comprise a water-tight (liquid-impervious) and/or substantially rigid material with relatively low light transmission and relatively low heat transmission, such as, for example, an opaque or translucent plastic, glass, or the like (e.g., plastic or glass having an opaque or translucent coating). Sidewall 664 is configured to: contain or hold the inner media containing algae (which generally is the same inner media that can be contained in the inner cavity of the light-cycle container), block or prevent transmission of sunlight into the cavity of the dark-cycle container, and/or provide thermal insulation from outside environment.

In some embodiments, dark-cycle container 608 further comprises an outer sidewall (not shown, but similar to the outer sidewall of the light-cycle container) defining an outer cavity (not shown) around sidewall 664 such that sidewall 664 is an inner sidewall, cavity 672 is an inner cavity, and trays 676 are disposed in inner cavity 672. In such embodiments, the outer sidewall can be configured such that if light is incident on the dark-cycle container (e.g., on the outer sidewall), at least a portion of incident ultraviolet (UV) light is not permitted to enter the outer cavity through the outer sidewall and at least a portion of incident non-UV light is permitted to enter the outer cavity through the outer sidewall. Stated another way, in the embodiment shown, the outer sidewall can be configured to filter at least some portion of UV light that is incident on the light-cycle container (e.g., on the outer sidewall). In some such embodiments, the outer sidewall is also configured to be translucent or opaque so as to be configured to block some portion (up to all) incident light from entering the outer cavity (and therefore the inner cavity) if light is incident on the outer sidewall. In other such embodiments, the outer sidewall is transparent and the inner sidewall is opaque such that incident light can help increase the temperature in the outer cavity but be prevented from entering the inner cavity.

Control unit 612 is configured to be coupled to the light-cycle container and to the dark-cycle container, and is further configured such that if liquid is present in one of the light-cycle container (e.g., in inner cavity 624) and the dark-cycle container (e.g., in cavity 668), the control unit can pump the liquid to the other of the light-cycle container and the dark-cycle container. For example, the control unit can be further configured such that, in embodiments where sidewall 664 of the dark-cycle container is an inner sidewall and the cavity defined by the inner sidewall is an inner cavity, and the dark-cycle container further comprises an outer sidewall defining an outer cavity around the inner sidewall (e.g., such that the plurality of air reservoirs are disposed in the inner cavity): (a) if a first liquid is present in the inner cavity of one of the light-cycle container and the dark-cycle container, the control unit can pump the first liquid to the inner cavity of the other of the light-cycle container and the dark-cycle container; and (b) if a second liquid is present in the outer cavity of one of the light-cycle container and the dark-cycle container, the control unit can pump the second liquid to the outer cavity of the other of the light-cycle container and the dark-cycle container.

Control unit 612 can also be configured to pump gas (e.g., air) between the light-cycle container and the dark-cycle container. For example, the control unit can be further configured such that if a liquid is present in the cavity of one of the light-cycle container and the dark-cycle container such that gas is trapped in at least a portion of the respective air reservoirs, the control unit can: (a) pump the liquid out of the cavity of the one of the light-cycle container and the dark-cycle container; (b) pump the gas out of the cavity of the one of the light-cycle container and the dark-cycle container, and into the cavity of the other one of the light-cycle container and the dark-cycle container; and (c) pump the liquid into the cavity of the other one of the light-cycle container and the dark-cycle container.

More particularly, in the embodiment shown, the control unit comprises one or more pumps (not shown) configured to pump gas (e.g., air), and one or more pumps (not shown) configured to pump liquid (e.g., water). More particularly, control unit 608 is shown with six (6) nodes 680, 684, 688, 692, 696, and 700. In the embodiment shown, node 680 comprises a liquid inlet, node 684 comprises a liquid inlet, node 688 comprises a liquid outlet, node 692 comprises an air inlet, node 692 comprises an air outlet, node 696 comprises liquid inlet/outlet, and node 700 comprises an air inlet/outlet. Additionally, control unit 612 comprises air pumps and valves (not shown) and liquid pumps and valves (not shown) each coupled to one or more of nodes 680, 684, 688, 692, 696, and 700. Control unit 612 can further comprise liquid sensors (not shown), air sensors (not shown), and suitable control circuits coupled to the pumps and valves to coordinate the various pumping, timing, and other functions described in this disclosure. Such sensors may sample the gas and/or the liquid to determine at what time to cycle liquid between light-cycle containers and/or dark-cycle containers. For example, liquid (e.g., inner media containing algae) can be cycled or pumped from a dark-cycle container to a light-cycle container when the carbon dioxide level in the gas trapped in the dark-cycle container reaches a threshold level (e.g., a predetermined threshold concentration). By way of another example, liquid (e.g., inner media containing algae) can be cycled or pumped from a light-cycle container to a dark-cycle container when the temperature of the inner media reaches a threshold level (e.g., a predetermined threshold temperature).

Some embodiments of system 600 comprise a plurality of control units. In such embodiments, each control unit may include a subset of the components listed above to accommodate and/or facilitate different flow patterns between light-cycle units, dark-cycle units, and/or storage containers. In systems having many light units, dark units, and control units connected together, it may be more efficient and/or more reliable and/or less expensive to provide only a portion of the control units with air sensors and/or liquid sensors (e.g., to determine the timing of pumping liquid and/or gas between light-cycle containers and/or dark-cycle containers).

In operation, the system functions as follows, and in certain embodiments of the present methods can be operated as follows. Overall, system 600 generally cycles a fluid containing algae between a light cycle in which the liquid (and algae) is exposed to carbon dioxide-rich gas (e.g., air) and to light, and a dark cycle in which the liquid (and algae) is exposed to oxygen-rich gas (e.g., air) but generally not to light. In this way, the algae is permitted to undergo natural gas-exchange cycles in a controlled environment and in a controlled sequence that can improve the efficiency or rate at which the algae matures and/or multiplies. As mentioned above, the liquid containing algae may be referred to herein as an inner media because it will generally be pumped into or cycled through the inner cavity of the light-cycle container, and the system may further utilize an outer media that will generally be pumped into, cycled through, and/or contained in the outer cavity of the light-cycle unit. The inner media can comprise saltwater, and the outer media can comprise fresh water.

The operation of system 600 will be described with reference to a system having a plurality of light cycle containers 604 and a plurality of dark-cycle containers 608; but some embodiments of the present systems can contain any suitable number of light-cycle containers (e.g., one, two, three, four, five, six, seven, eight, nine, ten, or more) and one dark cycle containers (e.g., one, two, three, four, five, six, seven, eight, nine, ten, or more). In general, outer media will flow from light-cycle containers to other light-cycle containers to collect heat from sunlight. Additionally, when the outer media reaches a threshold temperature, the outer media can be pumped to or through a heat-collection facility (e.g., a heat water generator system, a heat exchanger, or the like) to cool the outer media and/or capture some energy from the outer media. Once the outer media is cooled and/or energy is captured, outer media can then be pumped back to light-cycle containers. While outer media is described as having discrete locations, outer media will typically be a liquid or other fluid such that outer media may be present in all discussed elements at once (e.g., light cycle containers, heat-collection facility, etc.). In the flowchart shown, node 704 indicates outer media being pumped into light-cycle container 604 (e.g., into outer cavity 652) and node 708 indicates outer media being pumped out of light-cycle container 604 and to another point in the system, such as, for example, another light-cycle container, a dark-cycle container having an outer cavity, and/or a heat-collection facility.

Inner media will typically flow between light-cycle containers and dark-cycle containers to permit, for example, algae photosynthesis light reaction and dark reaction to occur sequentially and repeatedly. Air or other suitable gas is also typically pumped between light-cycle containers and dark-cycle containers. For example, node 712 indicates carbon dioxide-rich air being pumped into light-cycle container 604 (e.g., inner cavity 624). Once the carbon dioxide-rich air is pumped into the inner cavity, inner media can be pumped into the inner cavity, as indicated by node 716, such that the carbon dioxide-rich air is trapped in reservoirs 644. In this way, algae in the inner media is provided with carbon dioxide-rich air from which to draw carbon dioxide during light-cycle photosynthesis (which will result in the algae emitting oxygen to eventually convert the air into oxygen-rich air). As mentioned above, during the light cycle (e.g., continuously or at predetermined intervals), a control unit 612 can comprise one or more sensors configured to sample the trapped air to monitor carbon dioxide or oxygen levels such that when carbon dioxide and/or oxygen reaches a threshold level, the pumps in an appropriate control unit can be activated to pump the inner media from the light-cycle container to a dark-cycle container. For example, node 720 indicates inner media being pumped from the light-cycle container, and node 724 indicates the now oxygen-rich air being pumped from the light-cycle container after at least enough of the inner media has been removed to release the trapped air from reservoirs 644.

As indicated above, pumping or cycling of liquids such as inner and outer media, and of fluids such as air, will generally be performed by pumps and the like in one or more control units. As such, certain nodes in the flowchart will correspond with other nodes in the flowchart as air and liquids are cycled through the system. For example, node 720 shown with light-cycle container 604 corresponds to node 720 shown with the right-side control unit 612.

After oxygen-rich air is pumped from the light-cycle container at the end of the light cycle, the oxygen-rich air is then pumped into dark-cycle container 608 (e.g., cavity 652), as indicated at node 728. Once the oxygen rich air is pumped from the control unit into the dark-cycle container, the inner media is pumped from the control unit to the dark-cycle container, as indicated at node 732, such that oxygen-rich air is trapped in reservoirs 672. The control unit can also be configured to exchange a portion of the gas from one of the light-cycle container and the dark-cycle container with gas from the external environment. For example, excess oxygen-rich air can be also released to the atmosphere and/or additional air can be drawn in from the atmosphere at node 736. Similarly, as algae continues to grow in the inner media, it will be desirable to harvest some portion of the algae from the inner media. For example, it may be desirable and the control unit can be configured to monitor the concentration of algae in the inner media, and when that concentration reaches a threshold, to strain, filter, or otherwise harvest a portion of the algae from the inner media and to release or pump the harvested algae from the control unit, as indicated at node 740.

During the dark cycle, the algae will exchange carbon dioxide for oxygen, and the air trapped in reservoirs 644 will ultimately become carbon dioxide-rich. Similarly to the light cycle, during the dark cycle (e.g., continuously or at predetermined intervals) a control unit 612 can comprise one or more sensors configured to sample the trapped air to monitor carbon dioxide or oxygen levels such that when carbon dioxide and/or oxygen reaches a threshold level, the pumps in an appropriate control unit can be activated to pump the inner media from the dark-cycle container to a light-cycle container. For example, node 744 indicates inner media being pumped from the light-cycle container, and node 748 indicates the now carbon dioxide-rich air being pumped from the dark-cycle container after at least enough of the inner media has been removed to release the trapped air from reservoirs 672.

The left-side control unit is configured similarly to the right-side control unit. For example, excess oxygen-rich air can be also released to the atmosphere and/or additional air can be drawn in from the atmosphere at node 752, and can be configured to monitor the concentration of algae in the inner media, and when that concentration reaches a threshold, to strain, filter, or otherwise harvest a portion of the algae from the inner media and to release or pump the harvested algae from the control unit, as indicated at node 756.

In this way, system 600 can cycle inner media containing algae through one or more light-cycle containers and one or more dark-cycle containers, and each time the inner media passes through a control unit, the algae concentration can be checked and/or a certain amount of the algae harvested. In some embodiments, the dark cycles and light cycles can be timed to be cycled at intervals rather than upon a characteristic of the inner or outer media reaching a threshold. For example, inner media can be cycled periodically between light cycles and dark cycles (e.g., at intervals of equal to, less than, greater than, and/or between any of about: 1, 2, 3, 4, 5, 6, 7, 8, 9, 10, 11, 12, 13, 14, 15, 16, 17, 18, 19, 20, 21, 22, 23, 24, or more hours).

Figure 29A:
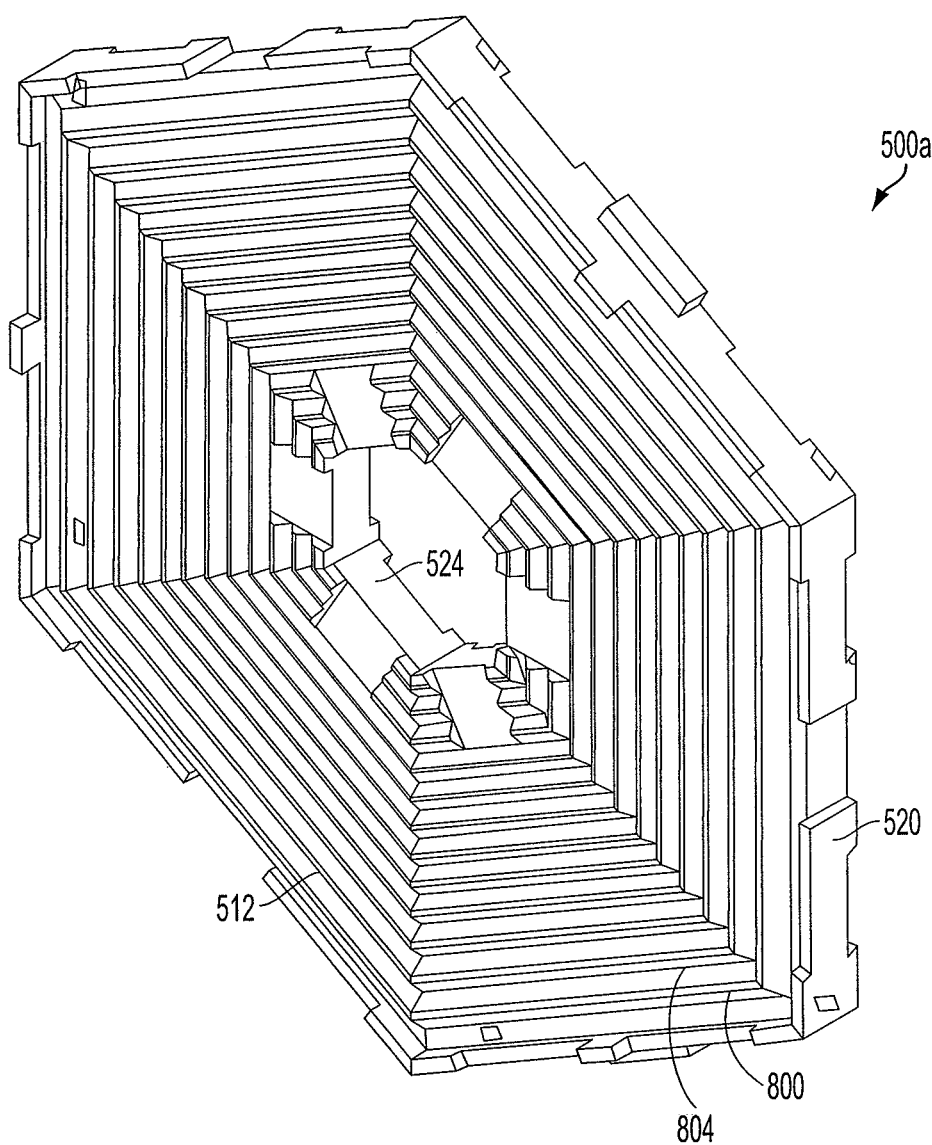
FIGS. 29A-29C depict various views of another embodiment of the hexagonal plant-aeration cell of FIGS. 19 and 20.
Figure 29B:
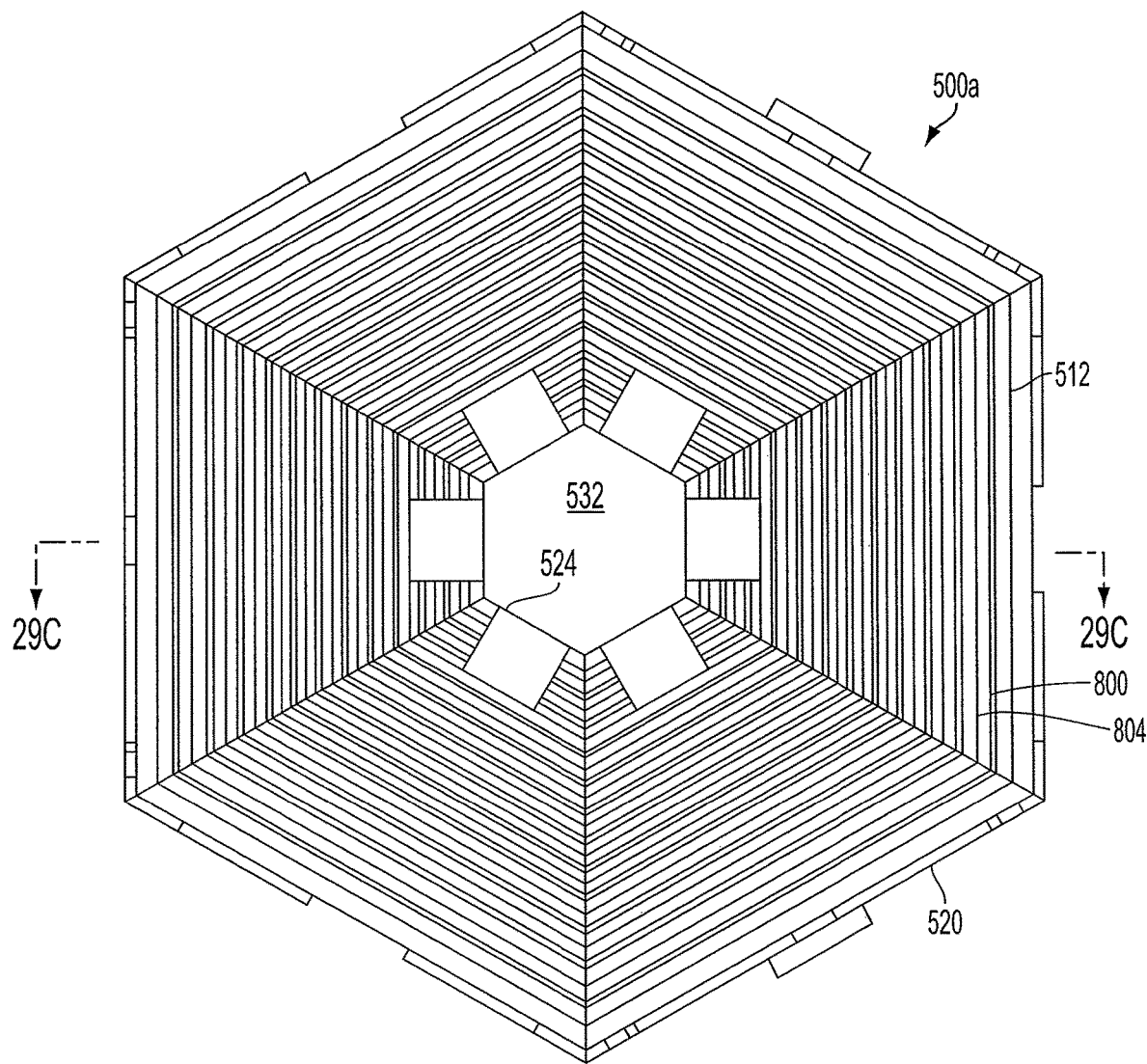
Figure 29C:
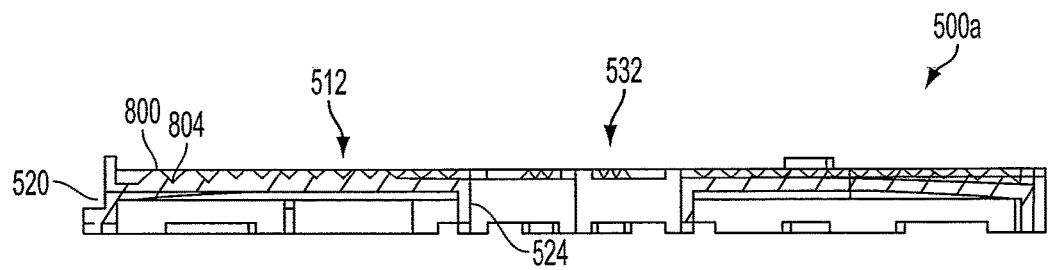
Figure 30:
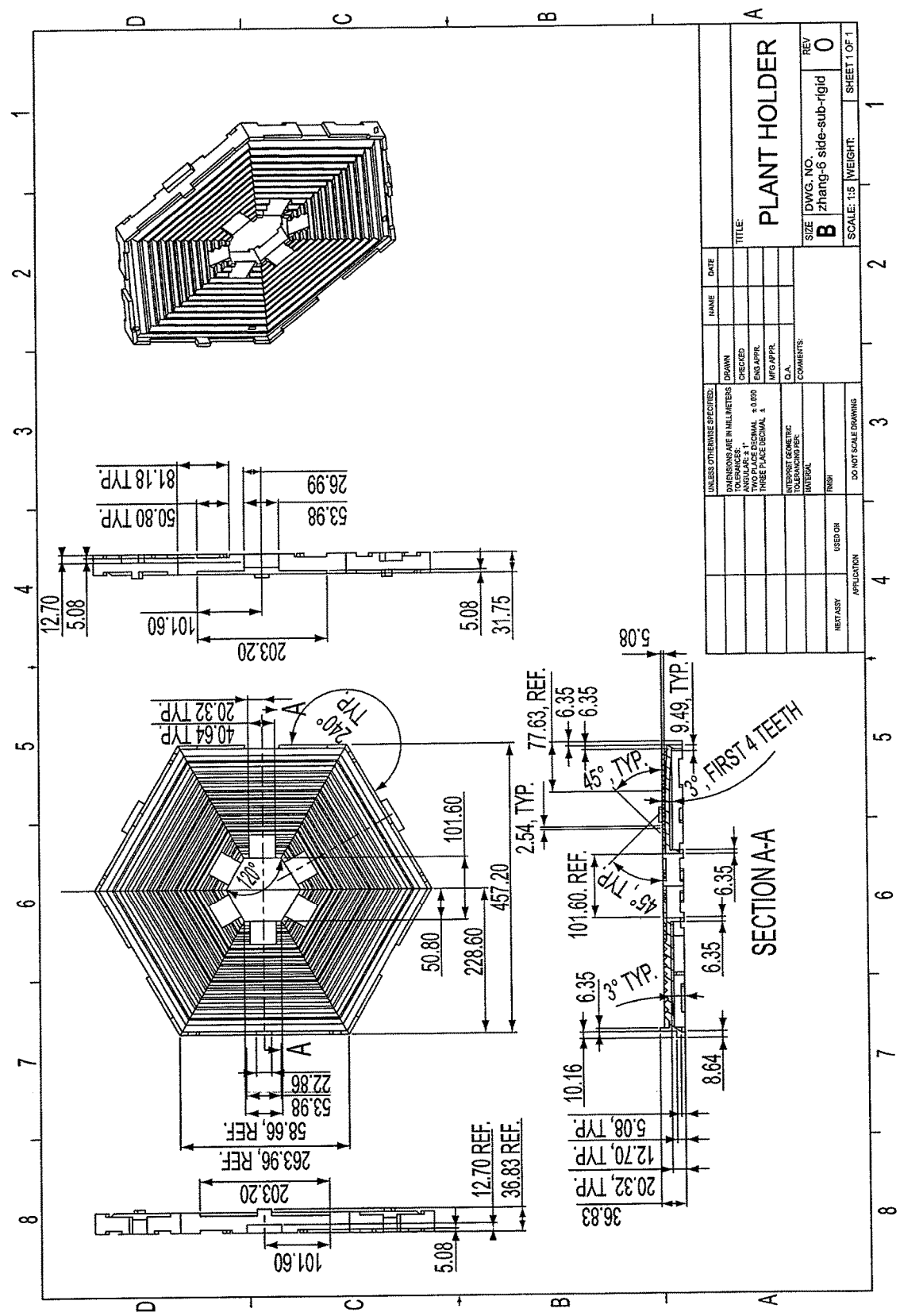
FIG. 30 depicts an engineering drawings of the embodiment of FIGS. 29A-29C.

Referring now to FIGS. 29A-29C and 30, various views are shown of another embodiment of a hexagonal plant-aeration cell 500a. FIG. 29A depicts a perspective view of cell 500a; FIG. 29B depicts a top view of cell 500a; FIG. 29C depicts a cross-sectional view of cell 500a taken along the line 29C-29C of FIG. 29B; and FIG. 30 depicts an engineering drawing sheet for the embodiment of FIGS. 29A-29C. Cell 500a is substantially similar to cell 500 of FIGS. 19 and 20. As such, the differences will primarily be described here. The primary difference is that top side 512 of cell 500a is configured such that if cells 500 are stacked (e.g., in a configuration similar to that of FIGS. 21 and 22) such that roots extend between cells 500a (e.g., adjacent to top surface 512 of one or more cells 500a) then roots will be exposed to air when water or other liquid is drained or removed (e.g., during low-tide conditions). More particularly, in the embodiment shown, top surface 512 comprises a plurality of ridges 800 and valleys 804. In this way, any water trapped on top surface 512 will be trapped in valleys 804 and plant roots will be at least partially (up to entirely) supported on ridges 800 such that the roots are at least partially (up to entirely) out of the water. In this way, when water or other liquid is drained or removed, the roots will be exposed to air or other gas so as to prevent rotting, mold, and/or the like. In the embodiment shown, ridges 800 encircle inner passage 532 and are parallel to both outer sidewall 520 and inner sidewall 524. In other embodiments, ridges 800 and can be configured in any suitable configuration. For example, ridges 800 can extend from outer sidewall 520 to inner sidewall 524, and or can be provided with a wavy or staggered orientation.

The various illustrative embodiments of devices, systems, and methods described herein are not intended to be limited to the particular forms disclosed. Rather, they include all modifications, equivalents, and alternatives falling within the scope of the claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A plant-aeration system for aeration of one or more plants, comprising:
a plant-aeration cell comprising:
an air reservoir unit comprising material that is gas-impermeable and having an interior; and
a root holder unit connectable to the air reservoir unit and having an interior, the root holder unit comprising a first set of one or more openings and a second set of one or more openings;
the air reservoir unit and the root holder unit forming, when connected to each other, a reservoir bounded by the interiors from which gas cannot escape when the reservoir is occupied by liquid having a level that is above the openings in the first and second sets of openings, and one side of an opening of the second set faces the reservoir while another side of that opening of the second set faces away from the reservoir and the plant-aeration cell.

2. The system of claim 1, further comprising:
a plant-growing cell configured to be disposed in operative relation with the plant-aeration cell, the plant-growing cell defining an open area in which one or more plants can grow, the plant-growing cell comprising mesh material.

3. The system of claim 2, further comprising:
one or more additional plant-aeration cells, each comprising:
an air reservoir unit comprising material that is gas-impermeable; and
a root holder unit connectable to the air reservoir unit, the root holder unit comprising a first set of one or more openings and a second set of one or more openings;
the air reservoir unit and the root holder unit forming, when connected to each other, a reservoir from which gas cannot escape when the reservoir is occupied by liquid having a level that is above the openings in the first and second sets of openings; and
one or more additional plant-growing cells, each configured to be disposed in operative relation with one or more of the plant-aeration cells, each defining an open area in which one or more plants can grow, and each comprising mesh material.

4. The system of claim 1, where the air reservoir and root holder units of each plant-aeration cell are integrally connected to each other.

5. The system of claim 1, where the first set of openings comprises one opening.

6. The system of claim 1, where the second set of openings comprises one opening.

7. The system of claim 1, where the first set of openings comprises multiple openings.

8. The system of claim 1, where the second set of openings comprises multiple openings.

9. The system of claim 1, where each plant-aeration cell possesses a generally rectangular shape when viewed from above.

10. The system of claim 1, where the root holder unit of each plant-aeration cell includes a first side in which the one or more openings in the first set are disposed, and a second side in which the one or more openings in the second set are disposed, and the second side is oriented at a non-zero angle relative to the first side.

11. The system of claim 1, where each plant-aeration cell possesses a generally hexagonal shape when viewed from above.

12. The system of claim 2, where the root holder unit of each plant-aeration cell includes a first side in which the one or more openings in the first set are disposed, and a second side in which the one or more openings in the second set are disposed, and the second side is oriented at a non-zero angle relative to the first side.

13. The system of claim 1, where the plant-aeration cell includes six sections connected to each other and defining a central open space bordered by the first set of one or more openings.

14. The system of claim 1, further comprising an anti-mold agent disposed on at least a portion of an exterior surface of each plant-aeration cell.

15. The system of claim 1, further comprising an anti-mold agent disposed on at least a portion of an interior surface of each plant-aeration cell.

16. The system of claim 1, where each plant-aeration cell includes an exterior surface having a white or off-white color.

17. The system of claim 1, where each plant-aeration cell includes an interior surface having a black or dark color.

18. A method for plant aeration comprising:
providing a plant-aeration cell comprising:
an air reservoir unit comprising material that is gas-impermeable; and
a root holder unit connected to the air reservoir unit, the root holder unit comprising a first set of one or more openings and a second set of one or more openings, the air reservoir unit and the root holder unit forming a reservoir from which gas cannot escape when the reservoir is occupied by liquid having a level that is above the openings in the first and second sets of openings;
disposing the cell in an environment that is exposed to liquid continuously or at least intermittently, such that:
a plant root extends through the one or more openings in the first set and into the reservoir; and
liquid can flow into the reservoir to a level above the openings in the first and second sets such that gas is trapped in the reservoir above the level of the liquid.

\* \* \* \* \*